United States Patent
Han et al.

(10) Patent No.: US 11,937,596 B2
(45) Date of Patent: Mar. 26, 2024

(54) ULTRA-FAST COOLING SYSTEM AND METHODS OF USE

(71) Applicants: Xu Han, Columbia, MO (US); Henry W. White, Columbia, MO (US); Peter Koulen, Leawood, KS (US)

(72) Inventors: Xu Han, Columbia, MO (US); Henry W. White, Columbia, MO (US); Peter Koulen, Leawood, KS (US)

(73) Assignees: THE CURATORS OF THE UNIVERSITY OF MISSOURI, Columbia, MO (US); CRYOCRATE LLC, Columbia, MO (US)

( * ) Notice: Subject to any disclaimer, the term of this patent is extended or adjusted under 35 U.S.C. 154(b) by 846 days.

(21) Appl. No.: 17/045,153

(22) PCT Filed: Apr. 5, 2019

(86) PCT No.: PCT/US2019/026162
§ 371 (c)(1),
(2) Date: Oct. 2, 2020

(87) PCT Pub. No.: WO2019/195791
PCT Pub. Date: Oct. 10, 2019

(65) Prior Publication Data
US 2021/0144990 A1    May 20, 2021

Related U.S. Application Data

(60) Provisional application No. 62/652,986, filed on Apr. 5, 2018.

(51) Int. Cl.
*F25B 19/02*    (2006.01)
*A01N 1/02*     (2006.01)
(Continued)

(52) U.S. Cl.
CPC ............ *A01N 1/0252* (2013.01); *F25B 19/02* (2013.01); *F25D 29/001* (2013.01); *G01N 1/42* (2013.01)

(58) Field of Classification Search
CPC . A01N 1/0252; F25D 29/001; H01L 23/4336; F25B 19/02; F25B 19/04; F28F 2250/02; G01N 1/42
See application file for complete search history.

(56) References Cited

U.S. PATENT DOCUMENTS

| | | |
|---|---|---|
| 4,535,838 A | 8/1985 | Gray et al. |
| 5,105,627 A | 4/1992 | Kurita |

(Continued)

FOREIGN PATENT DOCUMENTS

| | | | |
|---|---|---|---|
| DE | 10063262 A1 * | 7/2002 | ............... G01N 3/18 |
| EP | 1793185 A2 | 6/2007 | |
| WO | 2017041980 A1 | 3/2017 | |

OTHER PUBLICATIONS

Katkov et al., KrioBlast(TM) as a New Technology of Hyper-fast Cryopreservation of Cells and Tissues. Part I. Thermodynamic Aspects and Potential Applications in Reproductive and Regenerative Medicine, Cell Technologies in Biology and Medicine, Feb. 2018, pp. 530-535, No. 4, Springer Science+Business Media, LLC.

(Continued)

*Primary Examiner* — Brian M King
(74) *Attorney, Agent, or Firm* — Husch Blackwell LLP

(57) ABSTRACT

An improved ultra-fast cooling system is disclosed for cryopreservation of biomaterials. The ultra-fast cooling system is designed to uniformly vitrify or partially vitrify biomaterials, including but not limited to, human biomaterials, proteins, peptides, cells, stem cells, antibodies, neurons, human tissue, organs, cornea, skin, retina, eggs, sperm, embryos, body fluids, blood, serum, lymph fluid, animal tissue, plant biomaterials, plant tissue, germ plasma, pollen, (Continued)

plant sap, and bioengineered tissue, without cryoprotectants or with a low concentration of cryoprotectants. Cooling rates are sufficient to uniformly cryopreserve biomaterials, and can be used in diagnostic cytology and biological cryofixation applications. Other materials also can be cooled uniformly, such as inorganic materials for processing.

31 Claims, 24 Drawing Sheets

(51) Int. Cl.
*F25D 29/00* (2006.01)
*G01N 1/42* (2006.01)

(56) References Cited

U.S. PATENT DOCUMENTS

| | | | |
|---|---|---|---|
| 6,513,336 B2 | 2/2003 | Zurecki et al. | |
| 6,571,569 B1* | 6/2003 | Rini | F25B 19/02 62/304 |
| 7,310,955 B2 | 12/2007 | Hume et al. | |
| 2002/0177119 A1 | 11/2002 | Wisniewski | |
| 2006/0070401 A1 | 4/2006 | Bae et al. | |
| 2006/0080975 A1* | 4/2006 | Tilton | H01L 23/427 62/309 |
| 2008/0050717 A1* | 2/2008 | Brower, Jr. | A01N 1/02 435/2 |
| 2009/0133411 A1 | 5/2009 | Cheng | |
| 2010/0256622 A1 | 10/2010 | Baust et al. | |
| 2012/0255313 A1 | 10/2012 | Katkov et al. | |
| 2012/0293338 A1* | 11/2012 | Chaffey | G01K 1/024 340/870.02 |
| 2013/0111931 A1* | 5/2013 | Grinter | F25D 29/001 62/62 |
| 2014/0069119 A1 | 3/2014 | Katkov et al. | |
| 2015/0090878 A1 | 4/2015 | Remigy et al. | |
| 2015/0366229 A1 | 12/2015 | Trembley et al. | |
| 2016/0146483 A1* | 5/2016 | Sakai | F24F 6/04 261/26 |
| 2017/0184479 A1 | 6/2017 | Schryver et al. | |
| 2018/0058744 A1* | 3/2018 | Newman | F25B 19/005 |
| 2018/0217037 A1* | 8/2018 | Grölz | G01N 1/30 |
| 2018/0292051 A1* | 10/2018 | Ally | A01N 1/0268 |
| 2019/0170625 A1* | 6/2019 | Nijpels | G01N 1/42 |

OTHER PUBLICATIONS

Jiao et al., Numerical investigations of transient heat transfer characteristics and vitrification tendencies in ultra-fast cell cooling processes, Cryobiology, 2006, pp. 386-392, vol. 52, Elsevier Inc.

Ghosh et al., Cryogenic Machining of Polymeric Biomaterials: An Intraocular Lens Case Study, ASM Materials & Processes for Medical Devices Conference, 2007, 12 pages, Palm Desert, California.

Damerval et al., Nitrojet: decontamination, cutting and concrete scabbling by nitrogen technology, Proceedings of the Global 2009 congress—The Nuclear Fuel Cycle: Sustainable Options and Industrial Perspectives, Sep. 9, 2009, 1 page.

Han et al, Measurement of the size of intracellular ice crystals in the mouse oocytes using a melting point depression method and the influence of intracellular solute concentrations, Cryobiology, Dec. 2009, pp. 302-307, vol. 59, Issue 3.

Warnecke et al., Innovative D&D Technology Utilizing High Pressure Liquid Nitrogen for Scabbing, Cutting & Decontamination—9045, WM2009 Conference, Mar. 1-5, 2009, 16 pages, Phoenix, AZ.

Boutron et al., Theoretical Prediction of Devitrification Tendency: Determination of Critical Warming Rates without Using Finite Expansions, Cryobiology, 1990, pp. 359-377, vol. 27, Academic Press, Inc.

Ren et al., Theorectical Prediction of Vitrification and Devitrification Tendencies for Cryoprotective Solutions, Cryobiology, 1994, pp. 47-56, vol. 31, Academic Press, Inc.

Notice of Reasons for Rejection for Japanese Patent Application No. 2021-504138, dated Feb. 13, 2023, 9 pages.

* cited by examiner

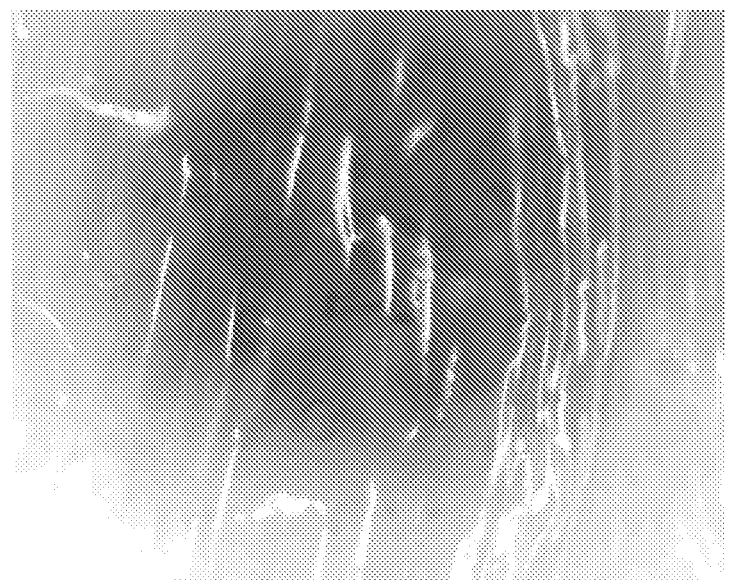
FIG. 18
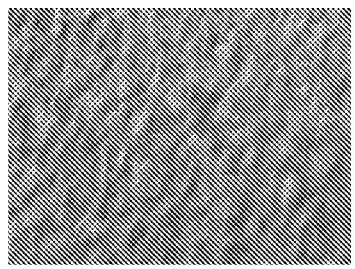 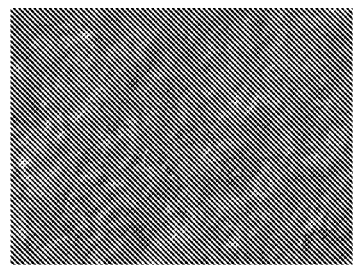 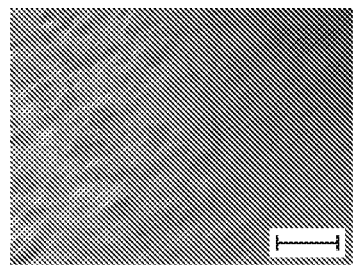
FIG. 19A     FIG. 19B     FIG. 19C

ULTRA-FAST COOLING SYSTEM AND METHODS OF USE

RELATED APPLICATIONS

This application claims priority to U.S. Provisional Patent Application 62/652,986 filed on Apr. 5, 2018; which is specifically incorporated by reference in its entirety herein.

GOVERNMENT FUNDING

This invention was made with government support under grants 1R43OD020163-01 and 1R43OD026279-01A1 awarded by National Institutes of Health. The government has certain rights in the invention.

FIELD

The disclosure relates generally to cooling of materials. The disclosure relates specifically to ultra-fast cooling of biomaterials.

BACKGROUND

Of great interest for an improved ultra-fast cooling system is application for its use in improvement of cryopreservation efficiency in biomaterials, such as large stocks of cells, cell cultures, tissues, and organs. Modern genetic engineering technologies such as CRISPR and gene library development are also generating astronomical numbers of cell lines that require extremely high throughput from cryopreservation procedures. Modern tissue engineering and tissue transplantation technologies are generating a tremendous number of artificial and donor tissues that require practical and efficient cryopreservation methods.

Traditional cryopreservation technologies were originally developed in the middle of last century from freezing of a small volume suspension by utilizing cell permeating or non-permeating cryoprotectants. To date, this slowly developing technology has already encountered numerous technical and practical issues that result in the following: i) regulatory concerns due to source and quality of cryoprotectants; ii) complicated and time-consuming procedures; iii) cell and tissue damage and/or functionality loss or change; and iv) procedural or outcome variations across different cells types or samples. To overcome these critical challenges, there is need for an improved ultra-fast cooling system for cryopreservation of biomaterials and methods use requiring minimal or no use of any cryoprotectant media and achieving vitrification or partial vitrification of the water components in the biomaterials. For protection of biomaterials during ultra-fast cooling, there exists a need for a sample holder that encapsulates the sample as a closed system and that maintains a high cooling rate and also provides protection of the sample against mechanical damage and contamination from cryogen during the cooling process.

A practical approach to achieving ultra-fast cooling rates is to use cryogenic liquids (e.g., liquid nitrogen or helium) to cool the samples. Traditional approaches to cooling biomaterials by directly plunging the samples into a container of static cryogenic liquids (e.g., liquid nitrogen or helium) inevitably generates the evaporation of liquid and form a vapor layer between the sample surface, as a so-called a pool boiling process. Due to the poor thermal conductivity of the vapor layer, the heat flux from the sample surface is significantly reduced, and the procedure generally requires extremely high concentrations (typically >50% v/v) of cryoprotectants to prevent any ice formation during cooling (i.e., a vitrification procedure). Using non-evaporating cryogenic liquid flows can potentially significantly increase the cooling rate by removing the gas layer between the liquid and sample surface and increase heat flux through the forced convection. High pressure non-evaporating cryogenic liquid jet devices, typically used for drilling, metal material processing (e.g., cutting) or other applications, is technically impractical to be adopted for cooling of biomaterials, due to the very high pressure (>5,000 psi) and small coverage area of liquid jets, e.g., Nitrojet® system described in [5,6,7]. Two-phase coaxial cryogenic jet technologies [8,9] (i.e., a conical cryogenic liquid jet protected by a co-axial conical cryogenic gas jet to prevent evaporation), e.g., the IceFly® system used for cooling of metal materials during drilling or other processing processes, reduce the high pressure to prevent liquid evaporation, but the area of coverage is very limited due to the procedure to maintaining the shape of the conical liquid nitrogen jet.

Currently, there is also an absence of a holding device design for biomaterials to be cooled by these jet technologies without direct contact of the biomaterial sample surface with cryogenic liquid flows, which causes potential issues in contaminations and tissues damage generated by mechanical impact. There is need for an ultra-fact cooling of biomaterials for both clinical uses (e.g., tissue transplantations) and biomedical research (e.g., tissue and cell cryopreservation, diagnostic cytology, tissue or cell cryofixation). A cooling system using multiple non-evaporating liquid flows to cover large sample surface, as well as a close protective system to hold the samples and prevent direct contact of the samples with non-evaporating cryogenic liquid flows and their vapor during cooling is needed. Also needed is a highly thermal conductive sample cover to separate the biomaterial sample and the cryogenic jets, to maintain the high heat flux between the sample and the jets.

To achieve the ultra-fast cooling rate, it would be advantageous to have an improved ultra-fast cooling system delivering a large amount of non-evaporating liquid cryogen directly onto the sample surface, and simultaneously prevent or greatly reduce evaporation of liquid cryogen during the processes of delivery and cooling, especially at locations proximate to surfaces being cooled. It would be advantageous to use the improved ultra-fast cooling system for use with samples having a combination of properties that include large area, small thickness, and large mass; namely, areas about 1 cm$^2$ and preferably about 1000 cm$^2$ or larger, with thickness of the critical sample portion, i.e., the sample portion targeted for cryopreservation, to be about 10 micrometers (μm) and preferably about 100 μm or thinner, and mass about one gram (gm) and preferably about 10 gm or larger. For ultra-fast cooling of samples that have a large surface area, there exists a need for the cooling system to provide uniform ultra-fast cooling over a large area. Such a system could be used in many applications in processing and preservation of materials, including, but not limited to cryopreservation of biomaterials, cryofixation of biomaterials, and also synthesis and processing of other materials. For preservation of biomaterials, such a system could be used in many applications with or without use of their culturing or holding medium, and including with a small amount of their culturing or holding medium.

SUMMARY

An embodiment of the disclosure is a cooling apparatus comprising: a manifold two-phase blade-jet assembly unit comprising: a manifold; a plurality of interior device blade units; and a plurality of exterior device blade units; and a sample holder system. In an embodiment, the cooling apparatus further comprises a source of a liquid cryogen and a source of a vapor cryogen. In an embodiment, the plurality of interior device blade units form a plurality of inlet ports. In an embodiment, the plurality of interior device blade units form a plurality of exit ports. In an embodiment, the cooling apparatus further comprises a plurality of liquid cryogen jets and a plurality of vapor cryogen jets. In an embodiment, the liquid cryogen jets and the vapor cryogen jets are interlaced position-wise, such that each liquid cryogen jet is flanked on each side by a vapor cryogen jet. In an embodiment, the interior device blade units and exterior device blade units are comprised of stainless steel, brass, copper, or aluminum. In an embodiment, the sample holder system comprises a material to be subjected to cooling. In an embodiment, the material is comprised of multiple masses and compositions. In an embodiment, the apparatus comprises multiple sample holders within the sample holder system. In an embodiment, the sample holder system comprises at least one of the units for cooling samples comprising a sample straw unit, a sample button unit, a sample straw carriage unit, a sample button carriage unit, a combination sample straw and button carriage unit, a combination sample straw and button carriage unit, and a sample holder-carriage unit. In an embodiment for the purpose of ultra-fast cooling of one or more thin biomaterial tissue samples and for maintaining sample purity, the sample button unit comprises a closed container that has a removable lid, and at least one thin window with high thermal conductivity over the temperature range of cooling, and wherein the said biomaterial tissue samples can be maintained in close thermal contact with the thin window. In an embodiment for the purpose of ultra-fast cooling a one or more small units of biomaterial samples and for maintaining sample purity, the sample straw unit comprises a closed container that has removable end caps, and at least one thin window with high thermal conductivity over the temperature range of cooling, and wherein the said small units of biomaterial samples can be maintained in close thermal contact with said thin window. In an embodiment, the apparatus comprises a plurality of manifold two-phase blade-jet assembly units.

An embodiment of the disclosure is a method of cooling comprising: cooling a material with a method utilizing the cooling apparatus above. In an embodiment, the method of cooling a material comprises: loading the material to be cooled into the sample holder system; activating an exhaust system for the vapor cryogen; inserting the sample holder system under a plurality of liquid cryogen jets and a plurality of vapor cryogen jets generated by the manifold two-phase blade-jet assembly unit; and cooling the material. In an embodiment, the sample holder system is removed after cooling. In an embodiment, the material that has been cooled is removed from the sample holder system. In an embodiment, each loaded individual sample holder is sealed. In an embodiment, the method further comprises sealing each loaded individual sample holder. In an embodiment, a rate of cooling is sufficient to vitrify the material. In an embodiment, a rate of cooling is sufficient to partially vitrify the material. In an embodiment, a rate of cooling is sufficient to cryopreserve the material. In an embodiment, the material is cryopreserved in the absence of a cryoprotective agent. In an embodiment, the material is a biomaterial. In an embodiment, the biomaterial is selected from the group comprising human biomaterials, proteins, peptides, cells, stem cells, antibodies, neurons, human tissue, organs, cornea, skin, retina, eggs, sperm, embryos, body fluids, blood, serum, lymph fluid, animal tissue, plant biomaterials, plant tissue, germ plasma, pollen, plant sap, and bioengineered tissue. In an embodiment, the biomaterial is selected from the group comprising human biomaterials, proteins, peptides, cells, stem cells, antibodies, neurons, human tissue, organs, cornea, skin, retina, eggs, sperm, embryos, body fluids, blood, serum, lymph fluid, animal tissue, plant biomaterials, plant tissue, germ plasma, pollen, plant sap, and bioengineered tissue in the presence of at least one cryoprotective agent (CPA). In an embodiment, a cooling rate of the biomaterial is about $10^3$ K/min to about $10^6$ K/min. In an embodiment, an area of the biomaterial is about 10 cm×10 cm. In an embodiment, an area of the biomaterial about $10^{-4}$ cm$^2$ to about 1000 cm$^2$. In an embodiment, the material has a mass between about 1 nanogram and about 10 grams. In an embodiment, the material is an inorganic material. In an embodiment, the method of cooling is for use in diagnostic cytology or tissue fixation.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

FIGS. 14A and 14B. One working sample contains two interior device blade units plus two exterior device blade units, generating one visible liquid nitrogen jet between two invisible gas nitrogen jets. FIGS. 14C and 14D. Another working sample contains six interior device blade units plus two exterior device blade units, generating three visible liquid nitrogen jets separated by four invisible gas nitrogen jets. The liquid cryogen blade jet assemblies and the vapor cryogen blade jet assemblies are interlaced position-wise, such that each liquid cryogen blade jet is flanked on each side and in close proximity by a vapor cryogen blade jet.

FIG. 18 is an optical image of the topmost layer of an onion tissue sample, i.e., the epidermal cell layer, taken through a microscope following slow-cooling of the onion tissue sample to nominally −196 degrees C. by dipping the onion tissue sample into an open bath liquid nitrogen, thawing in warm water (nominally 37 degrees C.) for 30 sec, staining, and taking the photograph.

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure can be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

The process of cryopreservation of biomaterials requires use of ultra-fast cooling techniques accompanied by use of either very little cryopreservation media, or even more preferably, use of no cryopreservation media. In addition, cryopreservation of biomaterials with large throughput requires use of an ultra-fast cooling system capable of uniformly cooling biomaterials with large surface areas. To produce vitrification of the biomaterial, the required cooling rates for such an ultra-fast system are about $10^6$ K/min. To achieve ultra-fast cooling rates, the sample biomaterial, or at least the critical portion of the biomaterial to be cooled, must be thin. For example, a layer about 50 microns in thickness or less is preferred in order to facilitate fast heat transfer from material to cryogen. As another example, if sample volumes in the range 0.1 ml to 1 ml are required, then it is desirable to have sample areas near or above 100 cm². As such, the apparatus and methods for the desired cooling rates should be able to cool extended areas, near or above 100 cm$^2$.

Figure 1:
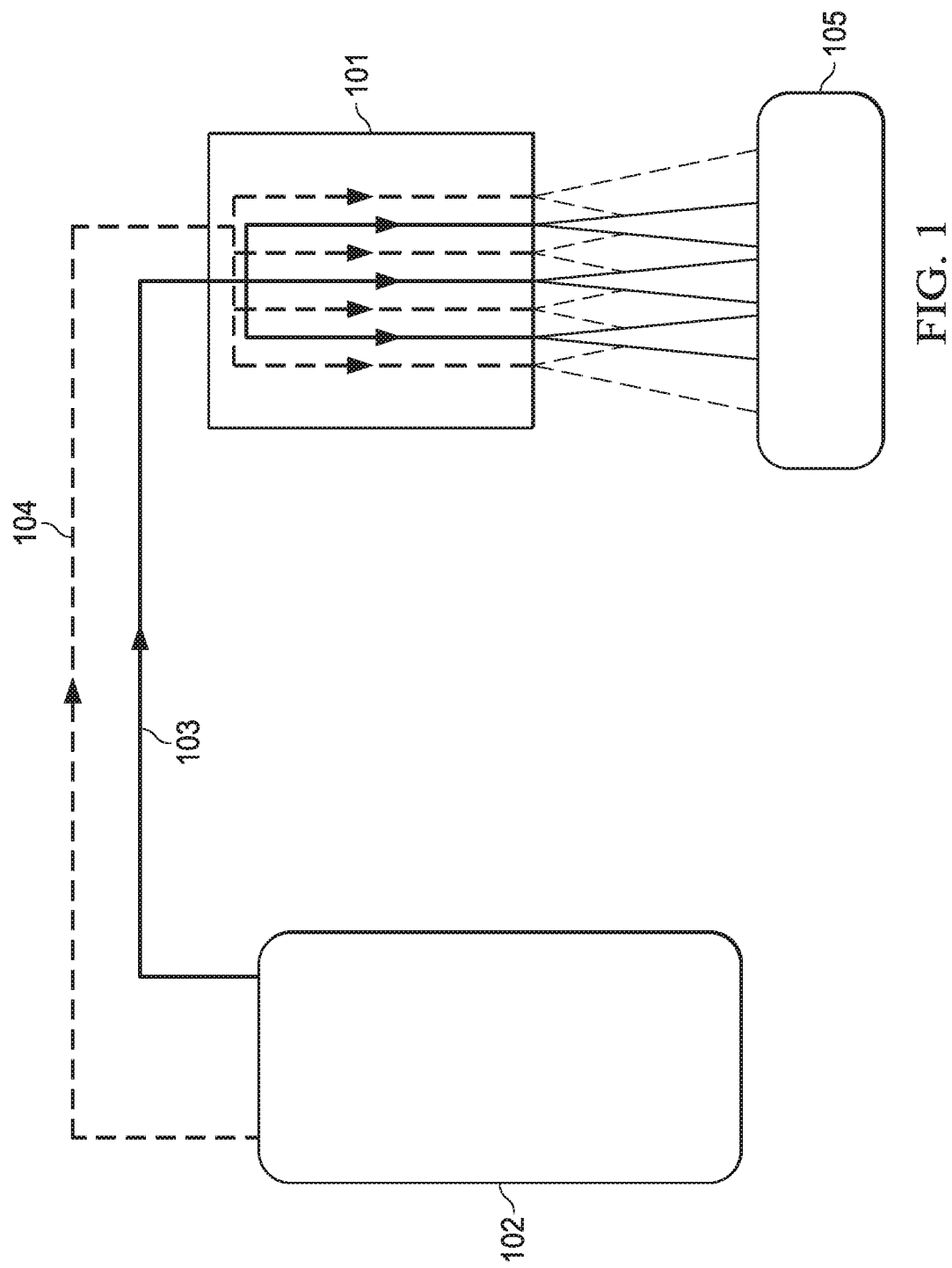
FIG. 1 is a schematic of the ultra-fast cooling system. The drawing is not to scale.

To achieve ultra-fast cooling, it is desirable for delivery of non-evaporating liquid cryogen onto the surface area, because gas bubbles can form in the liquid cryogen flow due to evaporation during the delivery process and significantly reduce the total heat flux from the sample surface, and therefore significantly reduce the cooling rate. In an embodiment, to decrease or prevent evaporation during delivery of liquid cryogen, it is desirable to cover the liquid cryogen flow surface with a precooled vapor cryogen flow layer to essentially surround and isolate the liquid cryogen flow from the environment, i.e., by use of a two-phase flow method. For samples with a large surface area, to reduce or prevent evaporation of the required large amount of liquid cryogen as well as achieve a uniform cooling rate on the surface, it is desirable to divide the flow of liquid cryogen into multiple sections. Each section of the liquid cryogen flow is preferably in a long and narrow blade shape, i.e., a blade jet, wherein both surfaces of each of the liquid cryogen blade jets are surrounded and covered by a vapor cryogen blade jet located in close proximity. Altogether, structurally, the cryogen delivery portion of the ultra-fast cooling device should be in the form of a two-phase and multiple-jet-blade system, with an array of liquid cryogen blade jets separated by an array of vapor cryogen blade jets. Except for the two exterior vapor cryogen blade jets, each liquid or vapor cryogen blade jet is sandwiched between two cryogen blade jets of the other phase, as shown in FIG. 1. The exterior cryogen blade jets can be of either phase, but preferably are vapor cryogen blade jets.

For protection of sample materials that are fragile, such as biomaterials, during the ultra-fast cooling process it is desirable to have a sample holder that encapsulates the sample and that has at least one exposed surface that exhibits high heat transfer properties to an impinging cryogen for protection of the sample against damage during the cooling process. For cooling of fragile samples that have a large surface area, there exists a need for a cooling system that can provide uniform cooling over a large area. For biomaterials, it is desirable to have a cooling rate that is sufficiently high to vitrify, or at least partially vitrify, either the whole sample or at least that portion of the sample that is critical for cryopreservation or cryofixation. To maintain biomaterial sample purity, it is desirable to either completely avoid permeating cryoprotective agents (CPAs, e.g., DMSO and glycerol), or at least have a concentration of CPA that is significantly lower than the concentration normally used in existing in cryopreservation methods. A sample can also include culturing or holding medium for a biomaterial. Whether without the use of CPAs, or with a low concentration of CPAs, in the preservation of biomaterials by an ultra-fast cooling process, it is highly advantageous to vitrify, or at least partially vitrify, the biomaterial by use of a cooling rate greater than or about 10$^6$ K/min. Such an ultra-fast cooling system should be versatile so that it can be adapted without extensive mechanical re-design for use with a plurality of sample shapes and sizes as well as a plurality of sample compositions including, but not limited to, biomaterials, cells, tissues, retinas, organic materials, inorganic materials such as materials having dissimilar layers, epitaxially grown semiconductor layers on a substrate, single crystal materials, and polycrystalline materials. Herein, use of the term CPA shall include CPAs commonly used in preservation processes that do not utilize cryopreservation methods.

In an embodiment, an ultra-fast cooling system can include sample holder units, sample carriage units, and sample carriage reservoir units. Sample carriage reservoir units facilitate transfer of vitrified and partially vitrified samples from an ultra-fast cooling device into a storage dewar by maintaining immersion of the samples within a reservoir of liquid cryogen located within the sample carriage reservoir unit during the transfer. Sample carriage reservoir units can contain carriage sample holders.

In an embodiment, a sample carriage unit is a carriage unit into which sample holder units are placed. Sample holder units can be of varied shapes, sizes, and designs for purposes of achieving the desired cooling rate and size of area to be cooled. The shapes and designs for a sample holder unit include, but are not limited to, straws of multiple types and buttons of multiple types.

An ultra-fast cooling system should be able to form a large volume and mass of vitrified water, i.e., solid state water without crystallization, or partially vitrified water, i.e., that portion of water that becomes solidified without crystallization, for use in cell or tissue cryopreservation or biomaterial cryofixation.

An ultra-fast cooling system should be versatile so that it can be adapted without extensive mechanical re-design for use:
with a plurality of different sample holder units, sample carriage units, and sample carriage reservoir units;
with a variety of commercially available cryostorage units for insertion and removal therefrom;
with synthesis and processing of a wide variety of commercially relevant materials; and with a variety of commercially available liquid cryogens and vapor cryogens, including but not limited to, liquid nitrogen, vapor nitrogen, liquid oxygen, vapor oxygen, liquid argon, and vapor argon.

The improved ultrafast cooling system of the present disclosure when used in cryopreservation of biomaterials differs from those for use in cryo-electron microscopy.

The improved ultrafast cooling system, when used in cryofixation of biomaterials, includes those for use in cryoelectron microscopy.

An embodiment of the disclosure is a manifold two-phase blade-jet assembly unit that forms ten liquid cryogen jets and eleven vapor cryogen jets as shown in FIG. 2-8. The cryogen can be selected from the list including, but not limited to, nitrogen, oxygen and argon.

Figure 15A:
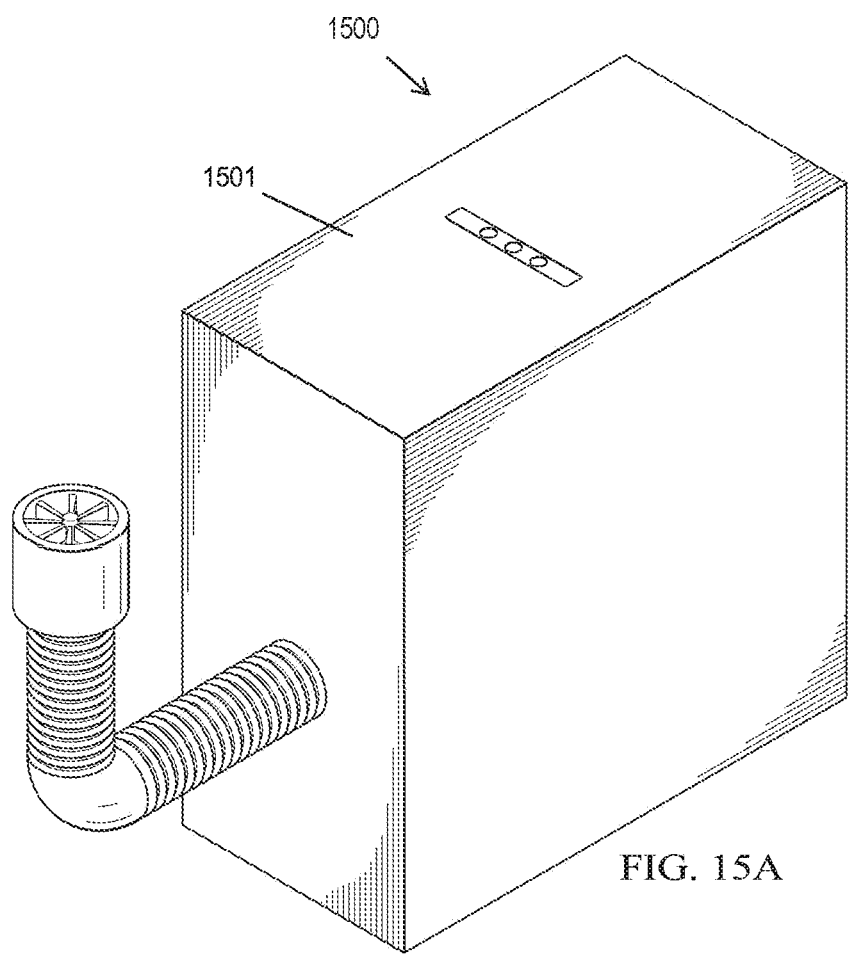
FIG. 15A-15C shows a fully operational ultra-fast cooling device at several stages during operation. The drawings are not to scale.
Figure 15B:
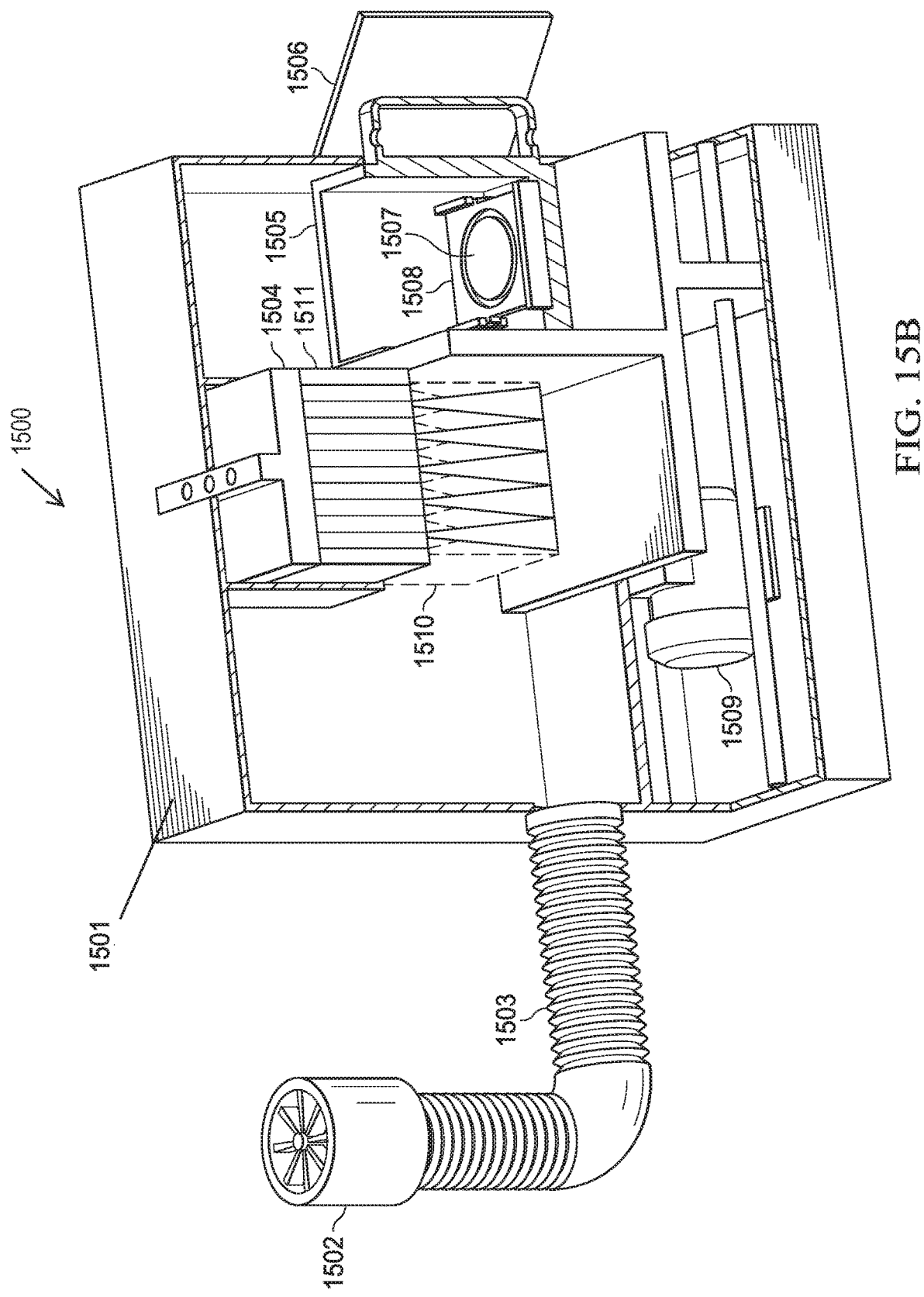
Figure 15C:
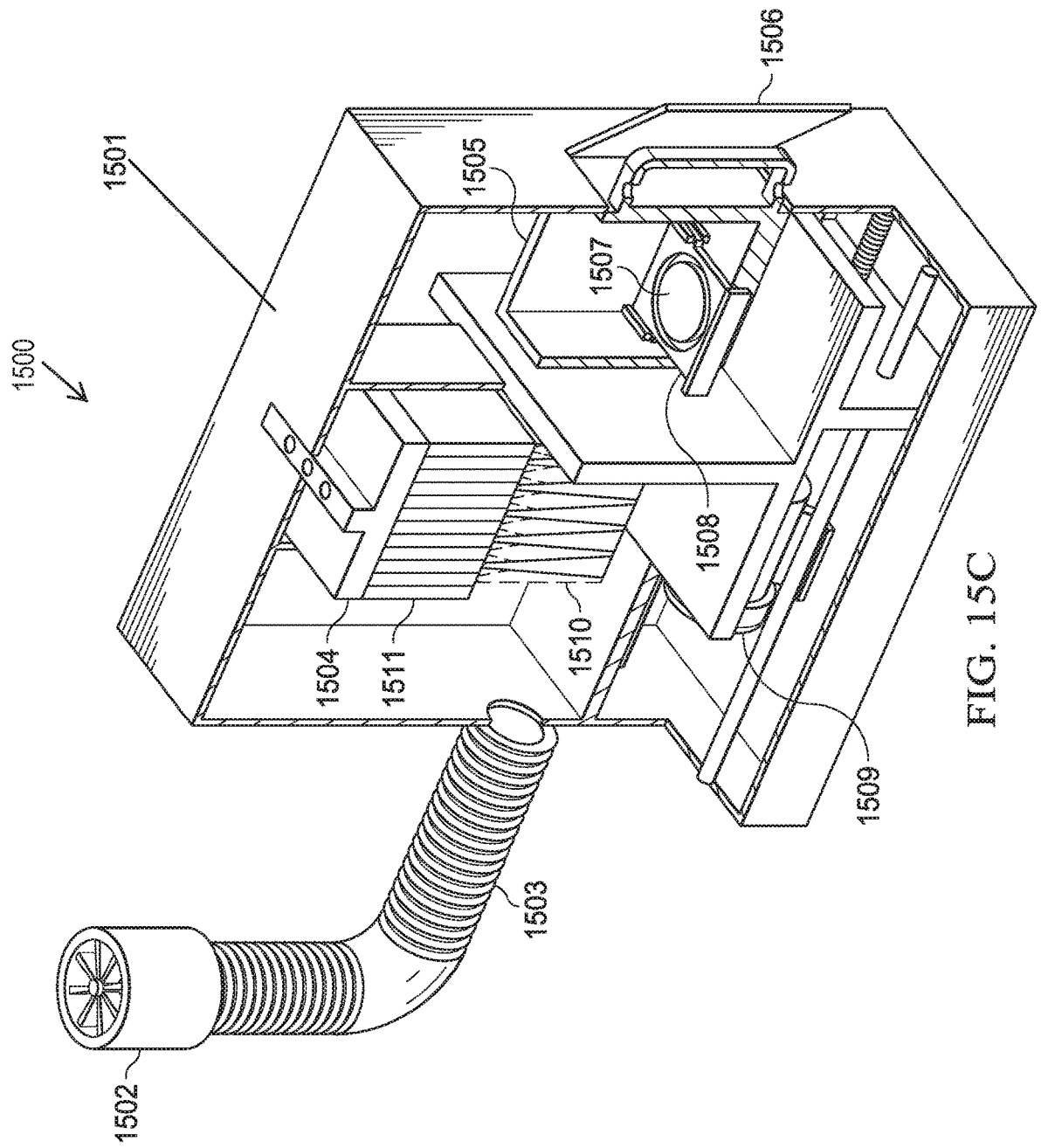

An embodiment of the disclosure is a fully operational ultra-fast cooling device 1500 as shown in FIG. 15A-15B. FIG. 15A shows an external view of the external vapor shroud 1501 that includes a venting fan 1502 at the end of a flexible pipe 1503. FIG. 15B shows one perspective demonstration of the operation of the embodiment during working status. FIG. 15C shows an alternative perspective to FIG. 15B, including the following items: a venting fan 1502 for cryogen generated by the cooling process; a flexible pipe 1503 linking the venting fan 1502 and inside workspace; a manifold 1504, comprising three input ports, with one liquid cryogen inlet and two vapor cryogen inlet ports for providing cryogen to a two-phase blade-jet array; a sample transfer kit 1505 that can be easily stored in a liquid cryogen dewar; a door 1506 for loading and removal of the sample transfer kit 1505; a disposable button sample holder 1507 which is a protective closed system that holds a tissue sample for cryopreservation; a sample holder system 1508 that contains the sample holder 1507 to be processed by the sample transfer kit 1505; the motor subsystem 1509 that enables automatic performance of sample loading and removal; jets

1510 comprising alternating liquid jets and vapor jets; and the two-phase blade-jet assembly unit 1511 that generates the liquid cryogen jets and vapor cryogen jets. FIG. 15C shows one perspective demonstration of the operation of the embodiment during working status when the sample transfer kit 1505 that contains the sample holder 1507 has been moved to a position under the two-phase blade-jet assembly unit 1511 and the sample is being cooled by liquid jets and vapor jets 1510. The liquid jets are non-evaporating and form a low-pressure liquid cryogen confluence flow plane. The cryogen can be selected from including, but not limited to, nitrogen, oxygen and argon.

Figure 14A:
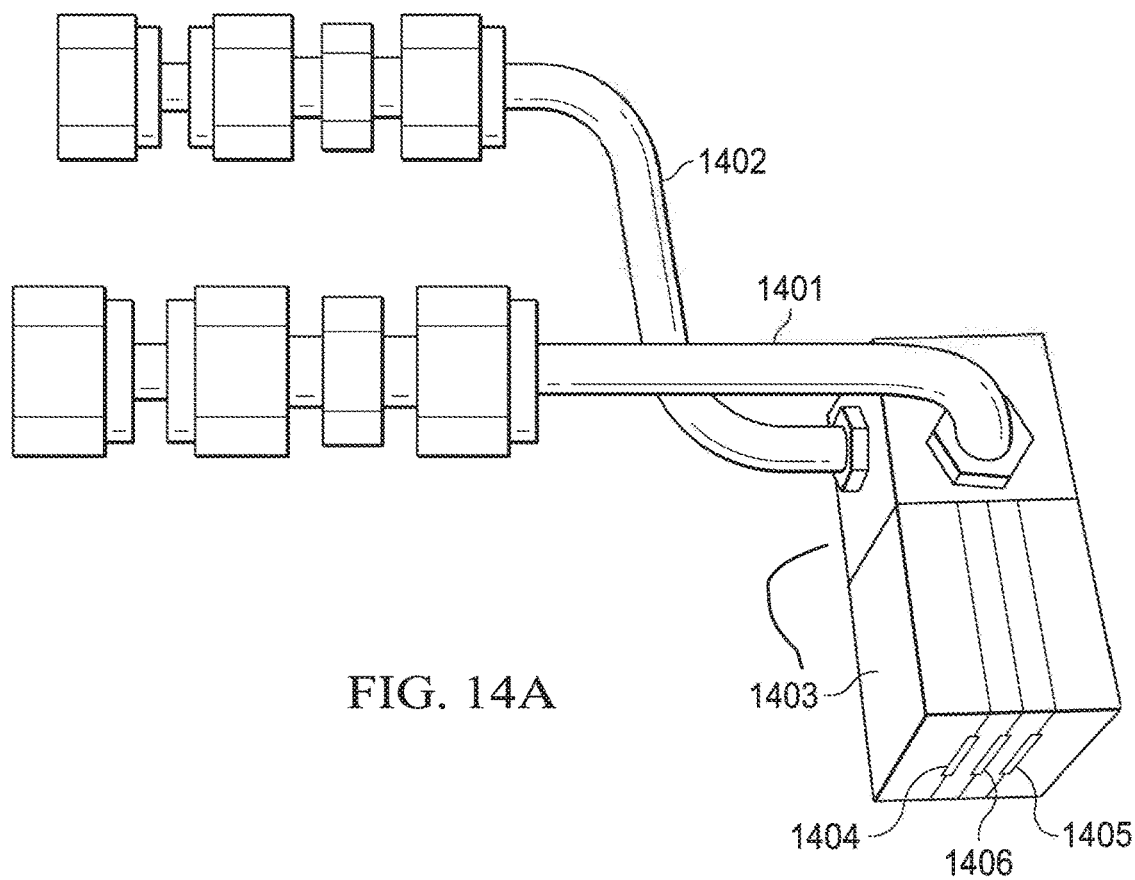
FIG. 14A-14D show two working samples for manifolds of two-phase blade-jet assembly units.
Figure 14B:
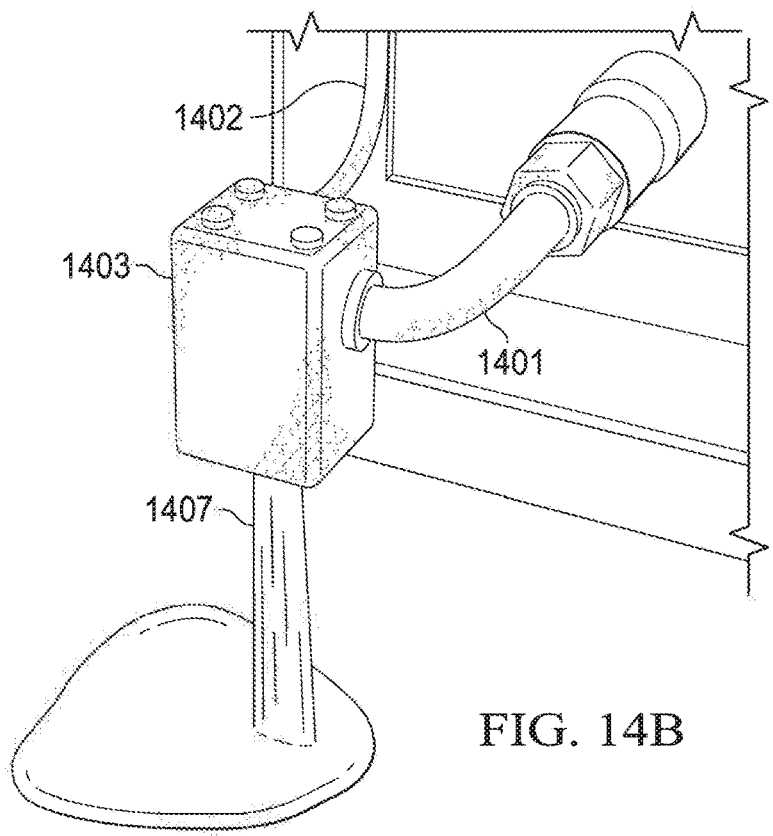

With reference to the above indicated figures and the following specifications, another example embodiment is directed to manifold two-phase blade-jet assembly unit, and also the manifold two-phase blade-jet assembly unit during operation. This embodiment is shown in FIG. 14A-14D. FIGS. 14A and 14B show the manifold two-phase blade-jet assembly unit for a single liquid nitrogen blade jet covered by two vapor nitrogen blade jets. The unit contains two interior device blade units plus two exterior device blade units that generate one long, narrow liquid cryogen jet and two long, narrow vapor cryogen jets located in proximity to the liquid cryogen jet and along each side. FIG. 14A shows details of the two-phase blade-jet assembly unit including: liquid nitrogen supply and input port 1401; cold gas nitrogen supply and input port 1402; manifold two-phase blade-jet assembly unit 1403; the two vapor nitrogen outlet ports 1404 and 1405; and the liquid nitrogen outlet port 1406. FIG. 14B shows in the manifold two-phase blade-jet assembly unit during operation. The liquid cryogen supply line 1401 is frost covered during operation. In an embodiment, the liquid nitrogen supply is from a commercially available phase separator linked to a standard 230 psi liquid nitrogen tank, and the vapor nitrogen supply is directly from the gas port of the same liquid nitrogen tank. The vapor cryogen supply line 1402 is only slightly frost covered. Clearly visible is the liquid nitrogen jet 1406. The liquid nitrogen jet 1406 when impinging on the table is rectangular in cross section, appears to the eye to be about 5 mm wide and about 2 cm long.

Figure 14C:
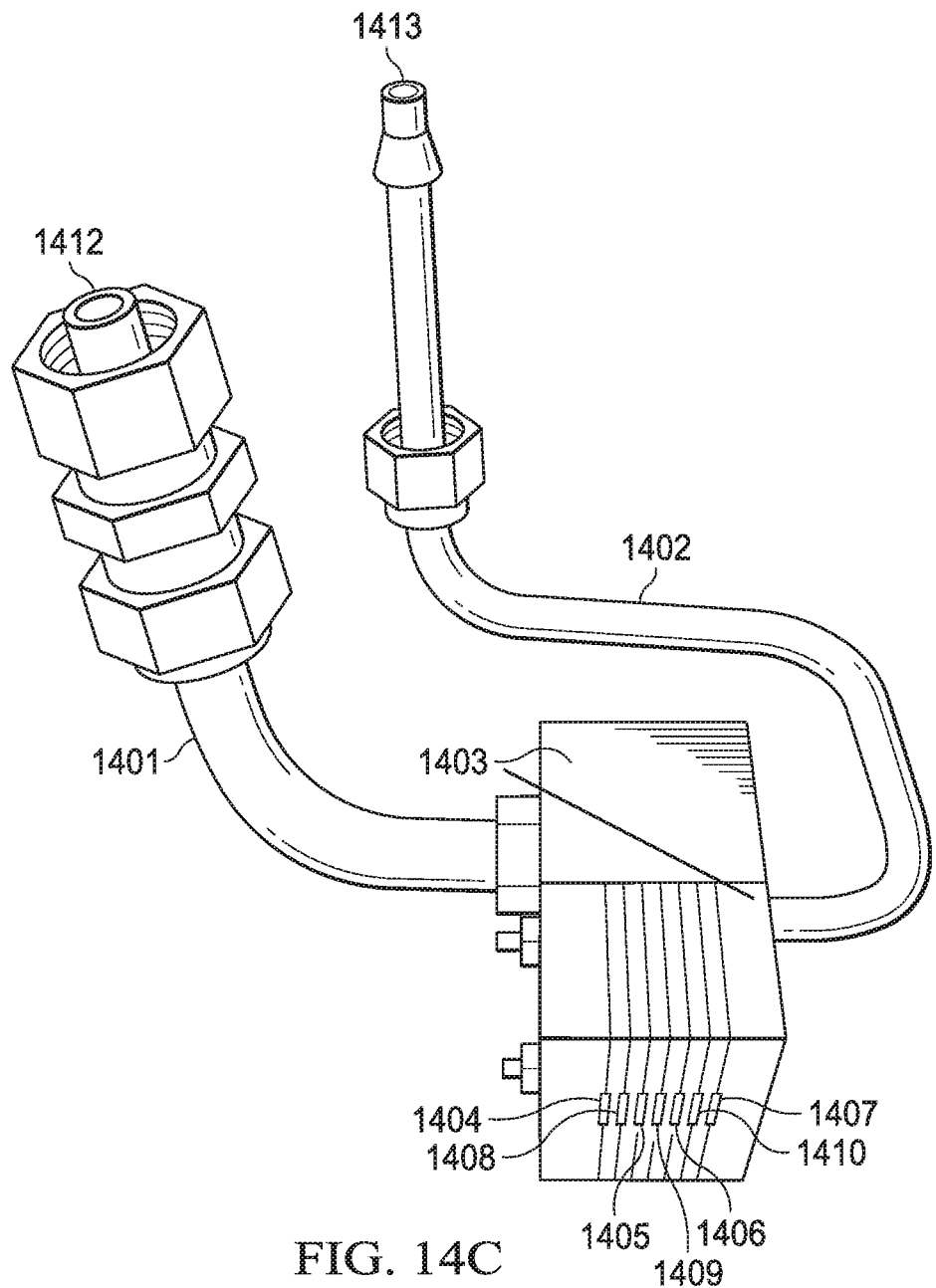
Figure 14D:
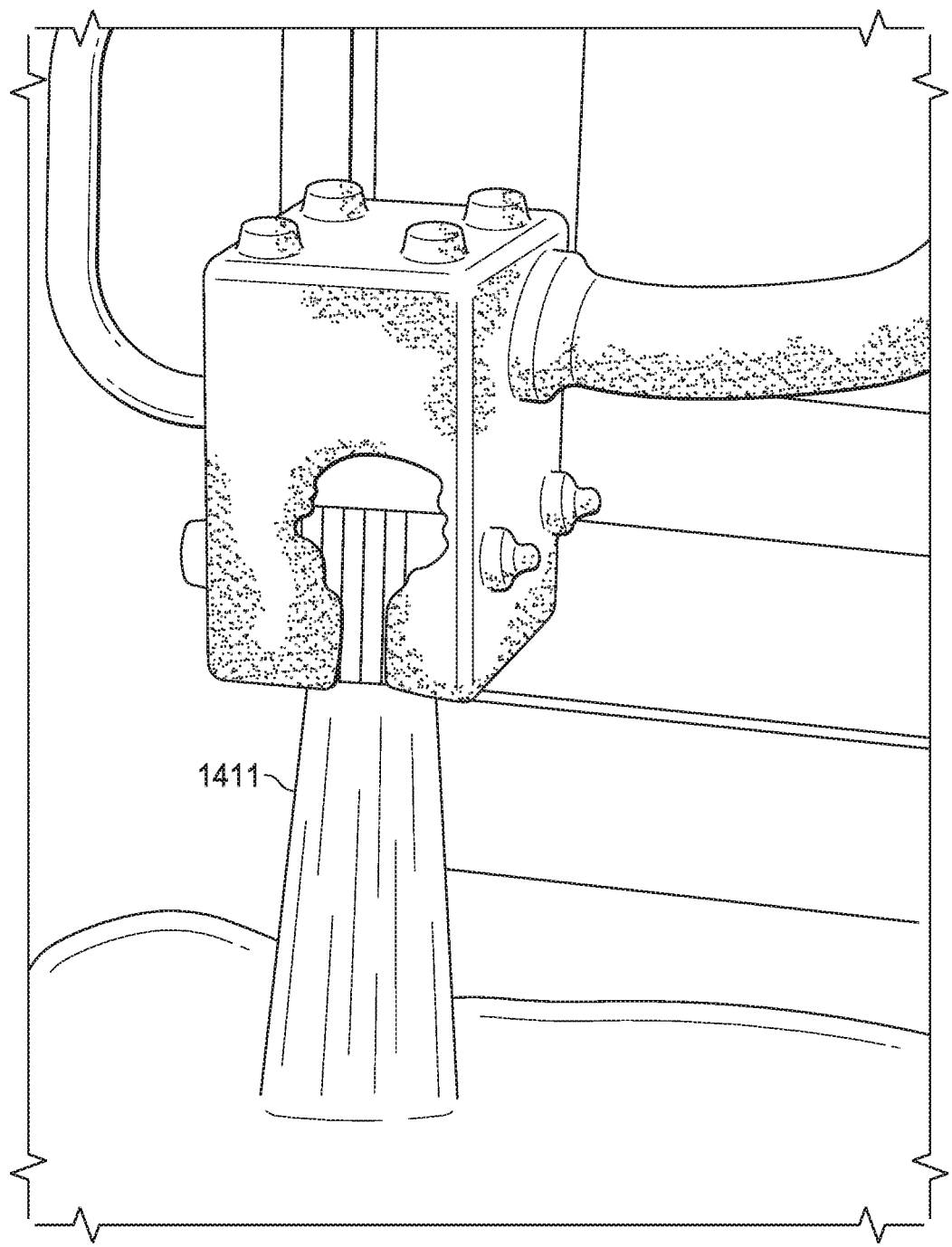

FIGS. 14C and 14D show the manifold two-phase blade-jet assembly unit for three liquid nitrogen blade jets, each of which is sandwiched by two vapor nitrogen blades jets, and thus use four vapor nitrogen blade jets. FIGS. 14C and 14D are similar to the device units showed in A and B. FIGS. 14C and 14D are device units formed by 6 interior device blade units plus two exterior device blade units. The array of the three liquid nitrogen blade jets 1408, 1409 and 1410 cover an area about 2 cm×2 cm. The four vapor nitrogen blade jets are 1404, 1405, 1406 and 1407.

In an embodiment, the dimensions for each of the two inlet ports for the single jet of liquid cryogen are 1.5 mm×1.5 mm. Similarly, the dimensions of the single inlet port for each of the two jets of vapor cryogen are 1.5 mm×1.5 mm. The spacing of the exit ports for both liquid and vapor nitrogen jets, located at the bottom of the manifold two-phase blade-jet assembly unit is 1 mm in the narrow direction, and 9.85 mm in the long direction. The inward slope on each blade, from top at inlet to bottom at exit, is about 0.72 degrees.

In an embodiment, the exterior dimensions of the two interior blades of the manifold two-phase blade-jet assembly unit are as follows: 19.85 mm wide (in the direction of the long dimension of the exiting jet of cryogen); 3.12 mm long (in the direction of the short dimension of the exiting jet of cryogen); and 19.67 mm tall (in the direction of the exiting jet of cryogen). The center-to-center separation distance for the two inlet ports for liquid cryogen is 3.75 mm.

In an embodiment, the manifold is comprised of a single block. The lower portion of the manifold block comprises interior ports machined to deliver liquid cryogen to the two inlet ports that were associated with the single liquid cryogen jet. The upper portion of the manifold block comprises interior ports machined to deliver vapor cryogen to the two inlet ports that were associated with the two vapor cryogen jets.

In an embodiment, the two-phase blade-jet assembly of the manifold two-phase blade-jet assembly unit is fastened into a set of blades by use of threaded holes and tap-screws.

In an embodiment, the manifold block of the manifold two-phase blade-jet assembly unit is fastened to the two-phase blade-assembly by use of threaded holes and tap-screws.

In an embodiment, the two vapor nitrogen blade jets are located on each side of the liquid nitrogen blade jet. In FIG. 14B, the two vapor nitrogen blade jets are faint, and not clearly visible. The selection of cryogen is not limited to nitrogen. The cryogen can include, but is not limited to, nitrogen, oxygen and argon.

In an embodiment, an improved ultra-fast cooling system comprises an improved manifold two-phase blade-jet assembly unit, a sample holder unit, a sample holder-carriage unit, a sample holder-carriage-reservoir unit, and a shroud with exhaust unit for removal of vapor cryogen from liquid cryogenic used, a liquid cryogen unit for storage of liquid cryogen under pressure and for providing control pressure and flow of liquid cryogen to a plurality of liquid manifold ports located on the manifold two-phase blade-jet assembly unit, and a vapor cryogen unit for storage of vapor cryogen under pressure and for providing control pressure and flow of vapor cryogen to a plurality of vapor cryogen manifold ports located on the improved manifold two-phase blade-jet assembly unit, and methods of use.

In an embodiment, an improved ultrafast cooling system comprises a plurality of improved manifold two-phase blade-jet assembly units, a plurality of sample holder units, a plurality of sample holder-carriage units, a plurality of sample holder-carriage units, a plurality of sample holder-carriage-reservoir units, and a shroud with exhaust unit for removal of vapor cryogens from cryogenic liquid used, a liquid cryogen unit for storage of liquid cryogen under pressure and for providing control pressure and flow of liquid cryogen to a plurality of liquid manifold ports located on the improved manifold two-phase blade-jet assembly unit, and a vapor cryogen unit for storage of vapor cryogen under pressure and for providing control pressure and flow of vapor cryogen to a plurality of vapor cryogen manifold ports located on the improved manifold two-phase blade-jet assembly unit, and methods of use.

In various embodiments, a plurality of liquid cryogens can be used, including, but not limited to, liquid nitrogen, liquid oxygen, and liquid argon. The boiling temperature for liquid nitrogen is about 77 K. The boiling temperature for liquid oxygen is about 90 K. The boiling temperature for liquid argon is about 87 K.

In various embodiments, the improved ultra-fast cooling system of the present disclosure can be used with a plurality of biomaterials including, but not limited to, human biomaterials, proteins, peptides, cells, stem cells, antibodies, neurons, human tissue, organs, cornea, skin, retina, eggs, sperm, embryos, body fluids, blood, serum, lymph fluid, animal tissue, plant biomaterials, plant tissue, germ plasma, pollen, plant sap, and bioengineered tissue.

In various embodiments, the improved ultra-fast cooling system can be used with a plurality of straw units containing biomaterials including, but not limited to, human biomaterials, proteins, peptides, cells, stem cells, antibodies, neurons, human tissue, organs, cornea, skin, retina, eggs, sperm, embryos, body fluids, blood, serum, lymph fluid, animal tissue, plant biomaterials, plant tissue, germ plasma, pollen, plant sap, and bioengineered tissue that are thin and cover a large area, including, but not limited to, 10 cm×10 cm. In an embodiment, the cooling rates includes, but is not limited to, $10^6$ K/min. In an embodiment, the ultra-fast cooling system does not use a permeating CPA. In an embodiment, the ultra-fast cooling system does not use a permeating CPA and the biomaterial is vitrified or partially vitrified. In an embodiment, the ultra-fast cooling system uses a concentration of permeating CPA that is low in comparison with concentrations employed in preservation of cells and tissue without use of any cryopreservation methods. In an embodiment, the ultra-fast cooling system uses a concentration of permeating CPA that is low in comparison with concentrations employed in preservation of cells and tissues without use of any cryopreservation methods and the biomaterial is vitrified or partially vitrified.

In an embodiment, the ultra-fast cooling system is able to form a large volume and mass of vitrified or partially vitrified water crystals of ice, for use studying the different phases of ice formed during vitrification of water, and water containing various solutes.

In an embodiment, the ultra-fast cooling system is versatile so that it can be adapted without extensive mechanical re-design for use:
- with a variety of commercially available cryostorage units for insertion and removal therefrom;
- with synthesis and processing of a wide variety of commercially relevant materials; and
- with a variety of commercially available liquid cryogens and vapor cryogens, including, but not limited to, liquid nitrogen and vapor nitrogen, liquid oxygen and vapor oxygen, and liquid argon and vapor argon.

In an embodiment, the ultra-fast cooling system would possess a sufficient cooling rate to vitrify biomaterials including, but not limited to, human biomaterials, cells, stem cells, tissues, skin, corneas, retinas, organic materials, and process inorganic materials, single crystal materials, polycrystalline materials, and materials having dissimilar layers.

The prior art does not teach an ultra-fast cooling system for cooling biomaterial including, but not limited to, human biomaterials, proteins, peptides, cells, stem cells, antibodies, neurons, human tissue, organs, cornea, skin, retina, eggs, sperm, embryos, body fluids, blood, serum, lymph fluid, animal tissue, plant biomaterials, plant tissue, germ plasma, pollen, plant sap, and bioengineered tissue that are thin and cover a large area, including, but not limited to, an area of 10 cm×10 cm and with cooling rates including, but not limited to, $10^6$ K/min:
- without use of a permeating CPA;
- without use of a permeating CPA, and wherein the biomaterial is vitrified or partially vitrified;
- with use with a concentration of permeating CPA that is low in comparison with concentrations employed in preservation of cells and tissue without use of any cryopreservation methods; or
- with use with a concentration of permeating CPA that is low in comparison with concentrations employed in preservation of cells and tissue without use of any cryopreservation methods, and wherein the biomaterial is vitrified or partially vitrified.

In an embodiment, the improved ultra-fast cooling system can be used to cool materials other than biomaterials including, but not limited to, inorganic materials such as materials having dissimilar layers, epitaxially grown semiconductor layers on a substrate, single crystal materials, and polycrystalline materials.

It is highly advantageous to possess the capability to vitrify biomaterial by an ultra-fast cooling process, wherein the cooling rate is about $10^6$ K/min, or greater.

It is highly advantageous to possess the capability to vitrify a large area of a biomaterial by an ultra-fast cooling process, wherein the cooling rate is about $10^6$ K/min, or greater.

The area of biomaterial cooled by the improved ultra-fast cooling system can be increased by employing a redesigned manifold two-phase blade-jet assembly unit that possesses a larger cooling area.

The area of biomaterial cooled by the improved ultra-fast cooling system can be increased by employing a plurality of manifold two-phase blade-jet assembly units.

It is highly advantageous to possess the capability to vitrify uniformly an area of biomaterial by an ultra-fast cooling process, wherein the area of the biomaterial is equal to or about $10^{-4}$ cm$^2$ and wherein the cooling rate is about $10^6$ K/min, or greater.

It is highly advantageous to possess the capability to vitrify uniformly an area of biomaterial by an ultra-fast cooling process, wherein the area of the biomaterial is equal to or about $10^{-2}$ cm$^2$ and wherein the cooling rate is about $10^6$ K/min, or greater.

It is highly advantageous to possess the capability to vitrify uniformly an area of biomaterial by an ultra-fast cooling process, wherein the area of the biomaterial is equal to or about 1 cm$^2$ and wherein the cooling rate is about $10^6$ K/min, or greater.

It is highly advantageous to possess capability to vitrify uniformly an area of biomaterial by an ultra-fast cooling process, wherein the area of biomaterial is equal to or about 10 cm$^2$ and wherein the cooling rate is about $10^6$ K/min, or greater.

It is highly advantageous to possess capability to vitrify uniformly an area of biomaterial by an ultra-fast cooling process, wherein the area of biomaterial is equal to or about 10 cm×10 cm and wherein the cooling rate is about $10^6$ K/min, or greater.

It is highly advantageous to possess capability to vitrify uniformly an area of biomaterial by an ultra-fast cooling process, wherein the area of biomaterial is equal to or about 20 cm×20 cm and wherein the cooling rate is about $10^6$ K/min, or greater.

It is highly advantageous to possess capability to vitrify uniformly an area of biomaterial by an ultra-fast cooling process, wherein the area of biomaterial is equal to or about 1000 cm$^2$ and wherein the cooling rate is about $10^6$ K/min, or greater.

The improved ultra-fast cooling system can utilize either a one manifold two-phase blade-jet assembly unit or a plurality of manifold two-phase blade-jet assembly units. If more than one manifold two-phase blade-jet assembly units is utilized to cool the biomaterial, a larger area of biomaterial can be cooled uniformly at an ultra-fast cooling rate.

The area that can be cooled uniformly by the improved ultra-fast cooling system is greater than or about 1000 cm$^2$.

If one or more than one manifold two-phase blade-jet assembly unit is utilized, the improved ultra-fast cooling system can be used to cool biomaterial uniformly with area in the range up to and exceeding 1000 cm² at an ultra-fast cooling rate.

If one or more than one manifold two-phase blade-jet assembly unit is utilized, then the improved ultra-fast cooling system can be used to vitrify biomaterial uniformly with area in the range up to and exceeding 1000 cm² at an ultra-fast cooling rate.

If one or more than one manifold two-phase blade-jet assembly unit is utilized, then the improved ultra-fast cooling system can be used to cool biomaterial uniformly with thickness about 50 microns or less, and with area in the range up to and exceeding 1000 cm2 at an ultra-fast cooling rate.

If one or more than one manifold two-phase blade-jet assembly unit is utilized, then the improved ultra-fast cooling system can be used to uniformly vitrify biomaterial with thickness about 50 microns or less and with area in the range up to and exceeding 1000 cm² at an ultra-fast cooling rate.

If changes in mechanical design are necessary to optimize performance of design parameters including, but not limited to, the cooling rate, uniformity of cooling rate over a large area, efficiency in use of liquid cryogen, thickness of biomaterial, safety, and area cooled, then liquid cryogens and vapor cryogens other than nitrogen can be utilized in the improved ultra-fast cooling system of the present disclosure. In an embodiment, these liquid cryogens can include, but are not limited to, oxygen cryogen and argon cryogen. In an embodiment, these vapor cryogens can include, but are not limited to, oxygen cryogen, and argon cryogen.

The improved ultra-fast cooling system can be utilized to cryopreserve biomaterials for use in health-related applications including, but not limited to, repair and replacement of biomaterials in animals or humans. In an embodiment, the biomaterials include, but are not limited to, eye cornea and eye retina.

The term biomaterials as recited throughout this disclosure encompasses biomaterials in the list including, but not limited to, human biomaterials, proteins, peptides, cells, stem cells, antibodies, neurons, human tissue, organs, cornea, skin, retina, eggs, sperm, embryos, body fluids, blood, serum, lymph fluid, animal tissue, plant biomaterials, plant tissue, germ plasma, pollen, plant sap, and bioengineered tissue, with CPAs or with a low concentration of CPAs.

The improved ultra-fast cooling system can be re-configured for use with a plurality of components that are either commercially available or custom manufactured without requiring major changes in mechanical construction of the improved ultra-fast cooling system.

The prior art does not teach an ultra-fast cooling system for uniformly cooling biomaterial in the list including, but not limited to, cells, stem cells, tissue, animal tissue, bioengineered tissue, artificial organs, vegetable tissue, germplasma, pollen, eggs, sperm, proteins, peptides, antibodies, body fluids, blood, serum, lymph fluid, plant sap, neurons, embryo, skin, cornea, and retina that are thin and:
cover a large area, including, but not limited to, an area of 10 cm×10 cm and with cooling rates including, but not limited to, $10^6$ K/min without use of a permeating CPA, and wherein the biomaterial is vitrified or partially vitrified;
cover a large area, including, but not limited to, an area of 10 cm×10 cm and with cooling rates including, but not limited to, $10^6$ K/min without use of a permeating CPA, and wherein the biomaterial is vitrified or partially vitrified; or
cover a large area, including, but not limited to, an area of 10 cm×10 cm and with cooling rates including, but not limited to, $10^6$ K/min with use with a concentration of permeating CPA that is low in comparison with concentrations employed in preservation of cells and tissue without use of any cryopreservation methods, and wherein the biomaterial is vitrified or partially vitrified.

Therefore, a need exists for an improved ultra-fast cooling system for uniformly cooling a biomaterial having a large area at a rate of at least about $10^6$ K/min. Furthermore, a need still exists for an ultra-fast cooling system for cooling a biomaterial:
at a rate of at least about $10^6$ K/min for uses including, but not limited to, cryopreservation of biomaterials;
having an area of at least about 100 cm² at a rate of at least about $10^6$ K/min furthermore, a need still exists for an ultra-fast cooling system for cooling a biomaterial at a rate of $10^6$ K/min for uses including, but not limited to, cryopreservation of biomaterials;
having an area of at least about 10 cm×10 cm at a rate of at least about $10^6$ K/min furthermore, a need still exists for an ultra-fast cooling system for cooling a biomaterial at a rate of $10^6$ K/min for uses including, but not limited to, cryopreservation of biomaterials;
having a mass of at least about 1 gm at a rate of at least about $10^6$ K/min furthermore, a need still exists for an ultra-fast cooling system for cooling a biomaterial at a rate of $10^6$ K/min for uses including, but not limited to, cryopreservation of biomaterials;
having a mass of at least about 10 gm at a rate of at least about $10^6$ K/min furthermore, a need still exists for an ultra-fast cooling system for cooling a biomaterial at a rate of $10^6$ K/min for uses including, but not limited to, cryopreservation of biomaterials;
having a large area at a rate of at least about $10^6$ K/min;
at a rate of at least about $10^6$ K/min for uses including, but not limited to, cryopreservation of biomaterials either without use of permeating CPAs or with use of a concentration of CPAs lower than that employed without cryopreservation;
at a rate of at least about $10^6$ K/min for uses including, but not limited to, vitrification of biomaterials without use of permeating CPAs, or with use of a concentration of CPAs lower than that employed without cryopreservation; and/or
at a rate of at least about $10^6$ K/min for uses including, but not limited to, cryopreservation of biomaterials for use in animal and human health.

In an embodiment, it is an object of the disclosure to provide an improved ultra-fast cooling system used to cryopreserve biomaterials and methods of use thereof.

In an embodiment, a manifold two-phase blade-jet assembly unit can have a plurality of blades and a plurality of liquid cryogen jets. In an embodiment, a manifold two-phase blade-jet assembly unit can be designed and optimized for use with liquid and vapor cryogens including, but not limited to, nitrogen, oxygen, and argon.

In an embodiment, a manifold in a two-phase blade-jet assembly unit that supplies ten liquid cryogen jets and eleven vapor cryogen jets will have two liquid cryogen supply ports and one vapor cryogen supply port. In another embodiment, additional ports can be employed.

Figure 6:
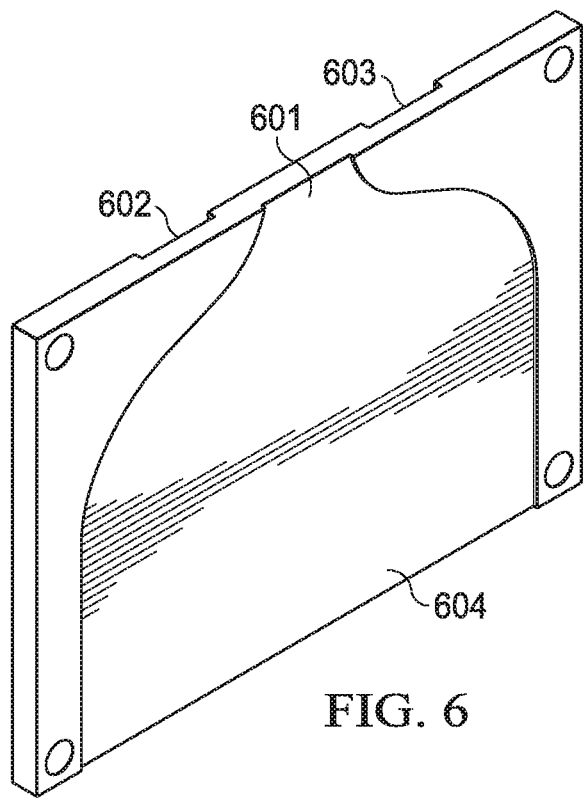
FIG. 6 is a perspective drawing of a blade showing on its viewable side the lined pattern shape of one-half of a vapor cryogen jet channel. The drawing is not to scale.
Figure 7:
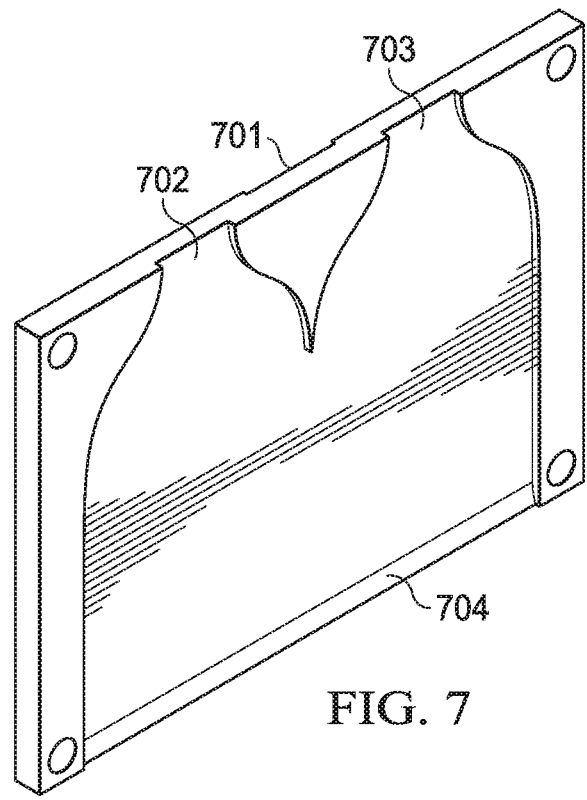
FIG. 7 is a perspective drawing of a blade showing on its viewable side the lined pattern shape of one-half of a liquid cryogen jet channel. The drawing is not to scale.

In an embodiment, the manifold distributes liquid cryogen into one or more selected ports located atop the stack of blades and distributes vapor cryogen into one or more selected ports located on the surface atop the stack of blades, wherein vapor cryogen ports alternate with liquid cryogen ports. In a further embodiment, vapor cryogen ports are located at the external lateral ends of the stack of blades, such that each liquid cryogen port is bounded by a vapor cryogen port. The blades are flat on both sides except for a region of material that has been removed such that liquid cryogen or vapor cryogen entering a port on the top surface is directed to the corresponding liquid/vapor exit located on the bottom side of the stack of blades, respectively. (FIG. 6, FIG. 7). In addition, both the pattern and the depth of removed material on each of the facing surfaces of any two adjacent blades is identical. Furthermore, in progressing from inlet port to exit port, the depth to which material is removed decreases for both liquid and vapor blades, such that the inlet ports are deeper than the exit ports. In an embodiment, an inlet port depth can be 0.75 mm deep, whereas the exit port can be only 0.5 mm wide. For these particular examples, the dimension of an inlet port in a direction perpendicular to plane of the blades would be 1.5 mm, and the dimension of the exit port in a direction perpendicular to plane of the blades would be 1.0 mm. As such, for this embodiment, liquid cryogen emerges in the form of thin, wide jets from alternate exit ports located on the surface below the stack of blades, with a width of 1.0 mm. For clarity, the length of the emerging jet of liquid cryogen is much longer than 1.0 mm, perhaps about 10 mm. In an embodiment, the cross-sectional shape of a liquid cryogen, perpendicular to the direction of flow is in the shape of a blade with length considerably longer than its width, with the ratio length/width in the range, but not limited to, 10/1 to 201/1. In an embodiment, the cross-sectional shape of a vapor cryogen, perpendicular to the direction of flow is in the shape of a blade with length considerably longer than its width, with the ratio length/width in the range, but not limited to, 10/1 to 20/1.

The number of inlet ports for liquid cryogen and the number of inlet ports for vapor cryogens can vary with the design of a manifold two-phase blade-jet assembly unit. Furthermore, not all blade units in a manifold two-phase blade-jet assembly unit need to be identical.

In an embodiment, each liquid cryogen jet is bounded on each side by vapor cryogen jets. The cryogen jets impinge on a thin layer of biomaterial to be cooled that is located in close proximity to the exit ports. This geometry of each liquid cryogen jet being surrounded on two long sides by vapor cryogen jets mitigates formation of vapor cryogen within the liquid cryogen jets prior to impinging on the biomaterial, and thereby increases the cooling rate of the liquid cryogen jets. The configuration whereby each liquid cryogen jet is blanked on either side by a vapor cryogen jet is referred to as a two-phase configuration.

The improved ultra-fast cooling system is further directed to use of a plurality of manifold two-phase blade-jet assembly units for purposes comprising cooling a larger area and cooling a plurality of different shapes of area to be cooled.

The ultra-fast cooling system is further directed to a sample holder unit. A sample holder unit encapsulates the sample material to be subject to ultra-fast cooling. In an embodiment, sample holder units can be comprised of holders including, but not limited to, straws and buttons.

The ultra-fast cooling system is further directed to a sample straw unit. In an embodiment, a sample straw unit is wide and has as top surface wall that is thin and is a good conductor of heat. In an embodiment, the length of a sample straw should be sufficiently long to permit loading of a sample biomaterial of desired mass with ample room at each end of the sample straw to prevent leakage during loading and capping each end of the sample straw.

In an embodiment, the mass of a biomaterial to be cooled is typically in the range from about 1 mg to about 1 gm. In an embodiment, the mass can be smaller than 1 mg. In an embodiment, the mass can be a nanogram. In an embodiment, the mass can be larger than 1 gm if the ultra-fast cooling system is designed with a sufficient number of liquid cryogen jets and vapor cryogen jets and if the biomaterial sample is sufficiently thin and sufficiently large in area. In an embodiment, the mass can be 10 gm.

In an embodiment, a plurality of sample straw units can be loaded with biomaterial that is to be cryopreserved. In an embodiment, a cap is placed over each end of a loaded sample straw to maintain purity of the biomaterial sample during the ultra-fast cooling process, and also during any cryopreservation storage.

In an embodiment, each loaded sample straw unit is first placed into a sample carriage unit with orientation such that during the ultra-fast cooling process, the thin surface walls of the sample straw units will be proximal to and directly exposed to the liquid cryogen jets exiting from the lower surface of the manifold two-phase-jet assembly. The orientation wherein the thin top surface walls of the sample straw units containing biomaterial are exposed to the large surface area of the liquid cryogen jets provides for ultra-fast cooling of a large area of biomaterial. In an embodiment, one or more thermocouples are attached to the sample straw-carriage unit in close proximity to one or more sample button units to monitor the temperature of sample straw units. The thickness of the bottom surface wall of a sample straw unit need not be as ultra-thin as the thin top wall since heat transfer from the biomaterial to the liquid cryogen jets occurs primarily through the top surface wall.

For ease in monitoring the loading process of the biomaterial in a sample straw unit and for verifying that proper loading of the biomaterial has occurred, it is desirable to have a transparent, visible window on one or more walls of each sample straw unit to facilitate verification that the biomaterial has been properly loaded into the sample straw unit by use of a visual inspection technique. In an embodiment, the transparent, visible window is located in the bottom surface wall.

In an embodiment, methods to determine if a biomaterial sample has been loaded into a sample straw unit include, but are not limited to, visual inspection through a transparent wall, and the difference in the mass of an unloaded straw and the mass of the straw for which loading has been attempted.

In an embodiment, one or more thermocouples can be affixed to a sample straw-carriage unit. In an embodiment, one or more thermocouples can be affixed to one or more sample button units.

For cryopreservation, sample straw units that have been cooled by the ultra-fast cooling system can be stored in liquid cryogen or stored in a freezer designed for preservation of biomaterial.

In an embodiment, the ultra-fast cooling system comprises a sample button unit. In an embodiment, the sample button unit is round, shallow, wide, and has a top surface wall that is both thin and also is a good conductor of heat. The interior of a sample button unit can be designed to facilitate cryopreservation of a plurality of biomaterial types. A plurality of designs for sample button units exists, including those designed for biomaterial types comprising, but not limited to, tissue and cells.

In an embodiment, the interior bottom surface of a sample button unit can be designed to facilitate a particular biomaterial type, such as cell or tissue. In an embodiment, the sample button contains a lid to seal the biomaterial inside the sample button unit to maintain purity during the ultra-fast cooling process and during any cryopreservation storage. The sample button unit is then sealed by placement of its top. A plurality of sample button units can be loaded with biomaterial that is to be cryopreserved.

In an embodiment, each loaded sample button unit is first placed into a sample button-carriage unit with orientation such that during the ultra-fast cooling process, the thin top surface walls of the sample button units located in the sample button-carriage units will be proximal to and directly exposed to liquid cryogen jets exiting from the lower surface of the manifold two-phase-jet assembly.

The orientation wherein the thin top surface walls of the sample button units containing biomaterial is exposed to the large surface area of liquid cryogen jets provides for ultra-fast cooling of a large area of biomaterial.

In an embodiment, one or more thermocouples are attached to the sample button-carriage unit in close proximity to one or more sample button units to monitor the temperature of the sample button units. In an embodiment, if the liquid cryogen blade jets impinge on the top surface of the button unit, then the thickness of the bottom surface wall of a sample button unit need not be as ultra-thin as the thin top wall since heat transfer from the biomaterial to the liquid cryogen jets occurs primarily through the top surface wall. One or more thermocouples can be affixed to a sample button carriage unit. One or more thermocouples can be affixed to one or more sample button units.

For cryopreservation, sample button units that have been cooled by the ultra-fast cooling system can be stored in liquid cryogen or stored in a freezer designed for preservation of biomaterial.

The improved ultra-fast cooling system can be designed to contain a plurality of sample holder systems.

The sample holder system can be a sample holder type including, but not limited to, a sample button unit, a sample straw unit, a sample button-carriage unit, a sample straw-carriage unit, a sample straw-and-button carriage unit, and a sample holder-carriage-reservoir unit. In an embodiment, the ultra-fast cooling system is further directed to a sample holder-carriage unit. A sample holder-carriage unit holds a plurality of sample holder units to be subject to ultra-fast cooling. Sample holder-carriage units can be comprised of sample holder-carriage units comprising sample straw-carriage units and sample button-carriage units.

The improved ultra-fast cooling system can be designed to contain a plurality of sample holder-carriage units that are designed to contain a plurality of sample units.

A sample holder-carriage unit can be designed to contain a plurality of sample unit shapes. A sample holder-carriage unit can be designed to contain a plurality of sample unit sizes. A sample holder-carriage unit can be designed to contain simultaneously a plurality of sample unit shapes and sizes. In an embodiment, the shapes of the sample units comprise straw units and button units.

A sample holder-carriage unit that is designed to contain only sample straw units can be designated as a sample straw-carriage unit. A sample holder-carriage unit that is designed to contain only sample button units can be designated as a sample button-carriage unit. A sample holder-carriage unit that is designed to contain multiple types of sample units can be designated as a sample multiple carriage unit.

The sample holder-carriage unit designed for use with a plurality of different sample units provides a convenient means to insert and remove a plurality of samples to be cooled into the ultra-fast cooling region directly below the cooling cryogen jets of the manifold two-phase blade-jet assembly unit.

Thermocouples can be attached to a sample holder-carriage unit to monitor temperature. In an embodiment, there is a means to insert and remove the sample holder carriage unit. In an embodiment, a handle on the sample holder carriage could be used by an operator to insert and remove a sample holder-carriage unit from the ultra-fast cooling region directly below the cooling cryogen jets of the manifold two-phase blade-jet assembly unit.

In an embodiment, the ultra-fast cooling system is further directed to a sample holder-carriage-reservoir unit. A sample holder-carriage-reservoir unit holds a plurality of sample holder-carriage units to be subjected to ultra-fast cooling. Sample holder-carriage-reservoir units can be comprised of sample straw-carriage-reservoir units and sample button-carriage-reservoir units. In an embodiment, a sample holder-carriage-reservoir unit is designed to contain a reservoir of liquid cryogen that will continue to exist after removal of the sample carriage unit from the ultra-fast cooling region directly below the cooling cryogen jets of the manifold two-phase blade-jet assembly unit. The reservoir of liquid cryogen in the sample holder-carriage-reservoir unit maintains the sample holder units at the temperature of the liquid cryogen during the process of removal of the sample carriage unit from the ultra-fast cooling region directly below the cooling cryogen jets of the manifold two-phase blade-jet assembly unit and subsequent placement of the sample units into a liquid cryogen storage container.

In an embodiment, insertion of a sample carriage unit and removal of the sample carriage unit into the region directly below the cooling cryogen jets of a manifold two-phase blade-jet assembly unit can be made by manual means by a human operator.

In an embodiment, an operator can use protective gloves for insertion and removal of a sample holder-carriage-reservoir unit from the ultra-fast cooling region directly below the cooling cryogen jets of the manifold two-phase blade-jet assembly unit.

In an embodiment, a sample holder-carriage-reservoir unit can have a handle for purposes of facilitating manual insertion and removal with such a handle having the features of a plurality of protrusions that can be grasped by an operator. In an embodiment, a sample holder-carriage-reservoir unit can have a handle for purposes of facilitating manual insertion and removal with such handle having the features of a plurality of protrusions that contain a plurality of holes into which a rod can be inserted and removed by an operator.

In an embodiment, an operator can use a tool for insertion and removal of a sample holder-carriage-reservoir unit. Tools used by an operator for insertion and removal of a sample holder-carriage-reservoir unit can comprise protective gloves and/or rods with hooks.

In an embodiment, a rod with a hook can be used to remove a sample holder-carriage-reservoir unit from the ultra-fast cooling region directly below the cooling cryogen jets of the manifold two-phase blade-jet assembly unit.

The sample holder carriage is further directed to a sample straw carriage unit designed for insertion and removal of a plurality of sample straw units into the region directly below the cooling cryogen jets of a manifold two-phase blade-jet assembly unit.

The sample holder carriage is further directed to a sample carriage unit designed for insertion and removal of a plurality of sample button units into the region directly below the cooling cryogen jets of a manifold two-phase blade-jet assembly unit.

In various embodiments, movement of a sample holder-carriage-reservoir unit and removal of the sample holder-carriage-reservoir unit into the region directly below the cooling cryogen jets of a manifold two-phase blade-jet assembly unit can be made by a motor controlled remotely, by automated control, or by a human operator.

A motorized transport system can provide advantages in the steps of insertion and removal of a sample holder-carriage-reservoir unit during operation of the improved ultra-fast two-phase cooling system including, but not limited to, convenience, speed of operation, and greater safety to the operator.

The ultra-fast cooling system is further directed to a vapor cryogen shroud that can capture and exhaust vapor cryogen generated before, during, and after a cooling procedure. In an embodiment, the primary component is an exhaust fan within a venting pipe that is connected to the roof or through an exterior wall of a building.

In an embodiment, the ultra-fast cooling system is further directed to a liquid cryogen storage and supply unit that contains liquid cryogen, with vapor cryogen located above the liquid cryogen. In an embodiment, the liquid cryogen storage and supply unit is a source of pressurized liquid cryogen and pressurized cryogen vapor that are transported in insulated hoses to liquid cryogen and vapor cryogen inlets, respectively, located on the manifold of the manifold two-phase-jet assembly unit. Internal pressure in the vapor cryogen region of the liquid cryogen storage and supply unit is provided by the pressurized tank of vapor cryogen. An adjustable pressure relief valve and gas regulator are used to adjust and maintain the internal pressure to a desired level. In an embodiment, the insulated hose carrying liquid cryogen has a flow meter and an adjustable flow valve to regulate the flow of liquid cryogen to the liquid cryogen inlet located on the manifold of the manifold two-phase blade-jet assembly unit. In an embodiment, the insulated hose carrying vapor cryogen has a flow meter and an adjustable flow valve to regulate the flow of vapor cryogen to the two vapor cryogen inlets on the manifold two-phase blade-jet assembly unit.

In an embodiment, a first blade jet receives liquid cryogen into multiple corresponding inlet ports, directs the cryogen through the assembly and ejects the respective cryogen through a corresponding cryogen exit port forming a jet of cryogen and the individual exit ports are positioned in a line so that the collection of cryogen jets from a blade of pressurized liquid cryogen; a second blade jet assembly receives vapor cryogen into multiple corresponding inlet ports, directs the cryogen through the assembly and ejects the respective cryogen through a corresponding cryogen exit port forming a jet of vapor cryogen, and the individual exit ports are positioned in a line so that the individual streams of vapor cryogen form a blade of vapor cryogen; wherein each blade is positioned in such a way that the two individual blade jets overlap in a single horizontal plane where the combined jet exhibits streams of alternating phase cryogen wherein the combined jet is terminated by an individual liquid cryogen stream on each end, and each vapor stream is positioned in between two liquid streams and each interior liquid stream is positioned in between two vapor streams.

In an embodiment, the manifold two-phase blade-jet assembly unit has a cross-sectional area of at least about 10 cm×10 cm. Embodiments of the disclosure are directed to an ultra-fast cooling system that comprises a plurality of manifold two-phase blade-jet assembly units wherein each manifold two-phase blade-jet assembly unit has cross-sectional area of at least about 10 cm×10 cm.

In an embodiment, the proper selection of the number and configuration of manifold two-phase blade-jet assembly units utilized during the cooling process allows ultra-fast cooling uniformly and:
cryopreservation of biomaterials that possess a wide range of areas;
vitrification of biomaterials that possess a wide range of areas;
partial vitrification of biomaterials that possess a wide range of areas;
cryopreservation of a large volume of a biomaterial;
vitrification of a large volume of a biomaterial; and/or
partial vitrification of a large volume of biomaterial.

The design, adjustments, and operation of the above components that comprise the ultra-fast cooling system are optimized to rapidly cool thin, large area samples of biomaterial at ambient room temperature and loaded into a plurality of sample straw units and placed in a sample carriage unit to be cooled uniformly to a temperature near 77 K. In an embodiment, the cooling rate of the biomaterial is at least about $10^6$ K/min. Cryopreserved biomaterials can be produced by this method.

FIG. 1 is a schematic of an ultra-fast cooling system that shows the following components: a manifold two-phase blade-jet assembly unit 101; a liquid cryogen storage and supply unit 102 capable of supplying liquid cryogen at a selected pressure and for supplying vapor cryogen at a selected pressure; a hose 103 to supply liquid cryogen to one or more liquid cryogen ports located on the manifold two-phase blade-jet assembly unit; a hose 104 to supply vapor cryogen to one or more vapor cryogen ports located on the manifold two-phase blade-jet assembly unit; and a sample holder system 105 located below the manifold two-phase blade-jet assembly unit such that liquid cryogen jets and vapor cryogen jets to rapidly cool samples located in the sample holder system. The sample holder system can be supported independent from the manifold two-phase blade-jet assembly unit or it can be inserted into a unit comprising the manifold two-phase blade-jet assembly unit and other units that facilitate rapid cooling of samples and safety to operating personnel. Not shown are in-line pressure regulators, flow meters, and adjustable flow valves located on liquid cryogen and vapor cryogen supply hoses that are used to regulate pressures and flows of liquid cryogen and vapor cryogen, respectively. Not shown is a shroud for removal of vapor cryogen. The schematic is not to scale.

Figure 2:
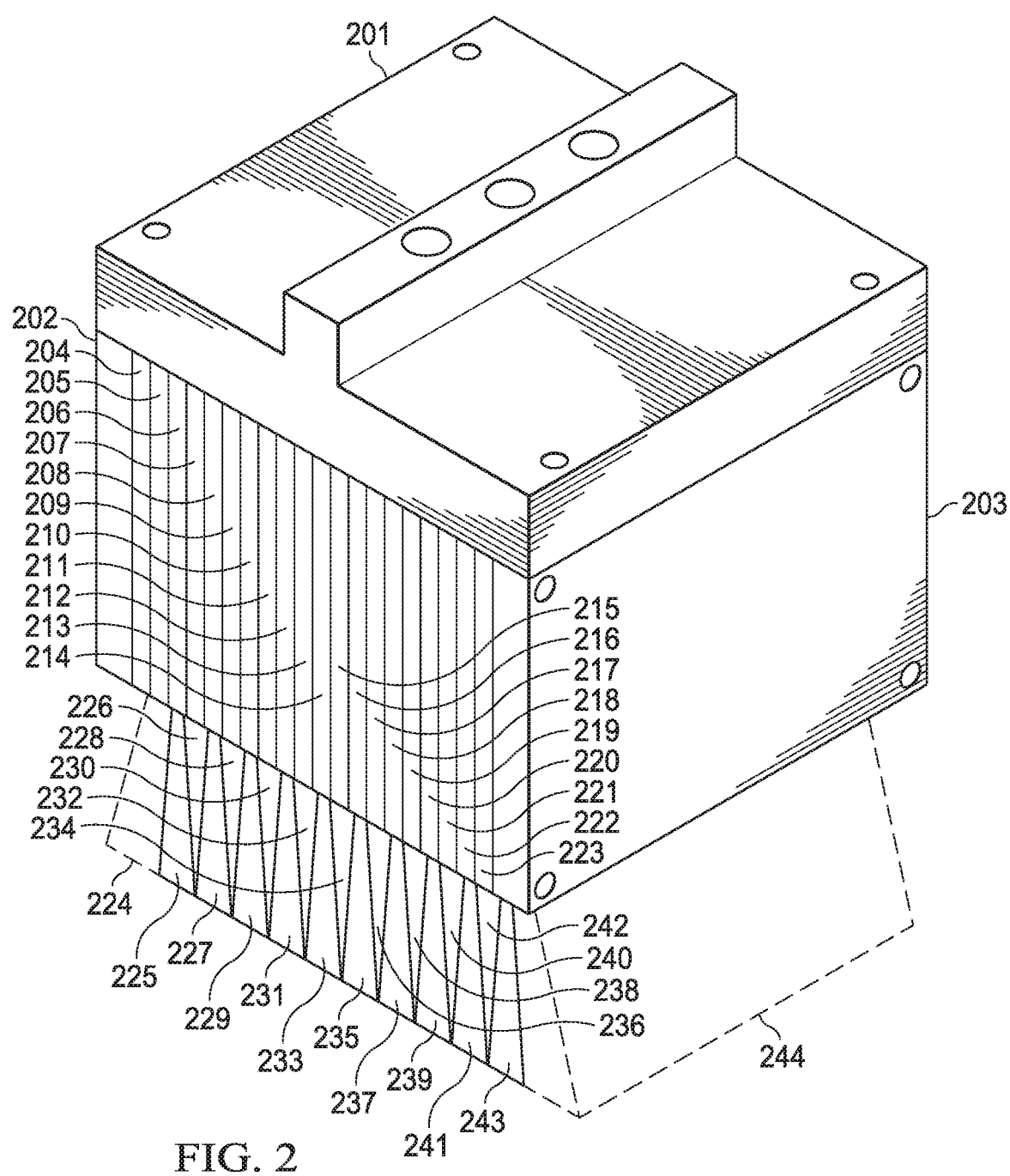
FIG. 2 is a perspective drawing illustrating the locations and the shapes of the liquid cryogen jets and vapor cryogen jets generated by the manifold two-phase blade-jet assembly unit of the ultra-fast cooling system for an embodiment having twenty interior device blade units plus two exterior device blade units. The drawing is not to scale.

FIG. 2 is a perspective drawing that illustrates locations of the liquid cryogen jets and vapor cryogen jets generated by the manifold two-phase blade-jet assembly unit of the ultra-fast cooling system for an embodiment having twenty interior device blade units 204, 205, 206, 207, 208, 209, 210, 211, 212, 213, 214, 215, 216, 217, 218, 219, 220, 221, 222, 223 plus two exterior device blade units 202 and 203. This embodiment generates ten liquid cryogen jets 225, 227, 229, 231, 233, 235, 237, 239, 241, 243 and eleven vapor cryogen jets 224, 226, 228, 230, 232, 234, 236, 238, 240, 242, 244. The drawing is not to scale. The manifold two-phase blade-jet assembly unit is fabricated using stainless steel. Other materials can also be utilized, including but not limited to, cryogenic grade stainless steel, brass, copper, and aluminum. The manifold two-phase blade-jet assembly unit is fastened together by means of a plurality of bolt fasteners. Alternatively, the manifold two-phase blade-jet assembly unit can be fastened together by means of a plurality of rivet fasteners. Furthermore, the manifold two-phase blade-jet assembly unit can be fastened together by means of a plurality of welds. In addition, the manifold two-phase blade-jet assembly unit can be fastened together by means of a combination of fastening methods including, but not limited to, bolt fasteners, rivet fasteners, and welds. The drawing is not to scale.

Figure 3:
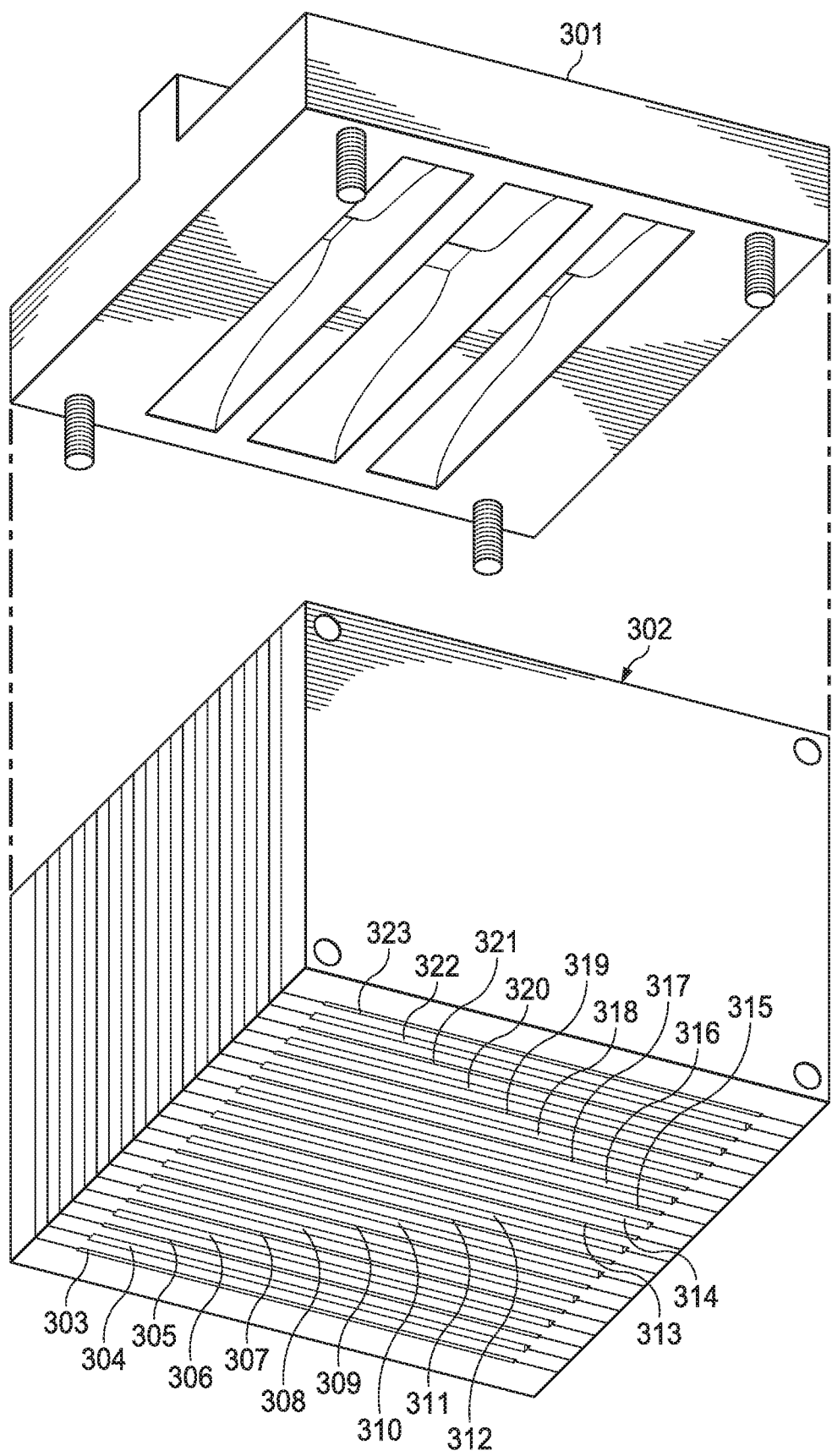
FIG. 3 is a perspective drawing showing the manifold separated from the stack of device blade units, with viewable exit apertures for ten liquid cryogen jets and eleven vapor cryogen jets. The drawing is not to scale.

FIG. 3 is a perspective drawing from below for an embodiment that shows the manifold 301 separated from the stack of device blade units 302, with viewable exit apertures for ten liquid cryogen jets 304, 306, 308, 310, 312, 314, 316, 318, 320, 322 and eleven vapor cryogen jets 303, 305, 307, 309, 311, 313, 315, 317, 319, 321, 323. Also shown are manifold exhaust ports for supplying vapor cryogen to a plurality of liquid cryogen inlets located on the stack of a plurality of interior device blade units when the manifold two-phase blade-jet assembly unit is fully assembled. The drawing is not to scale.

Figure 4:
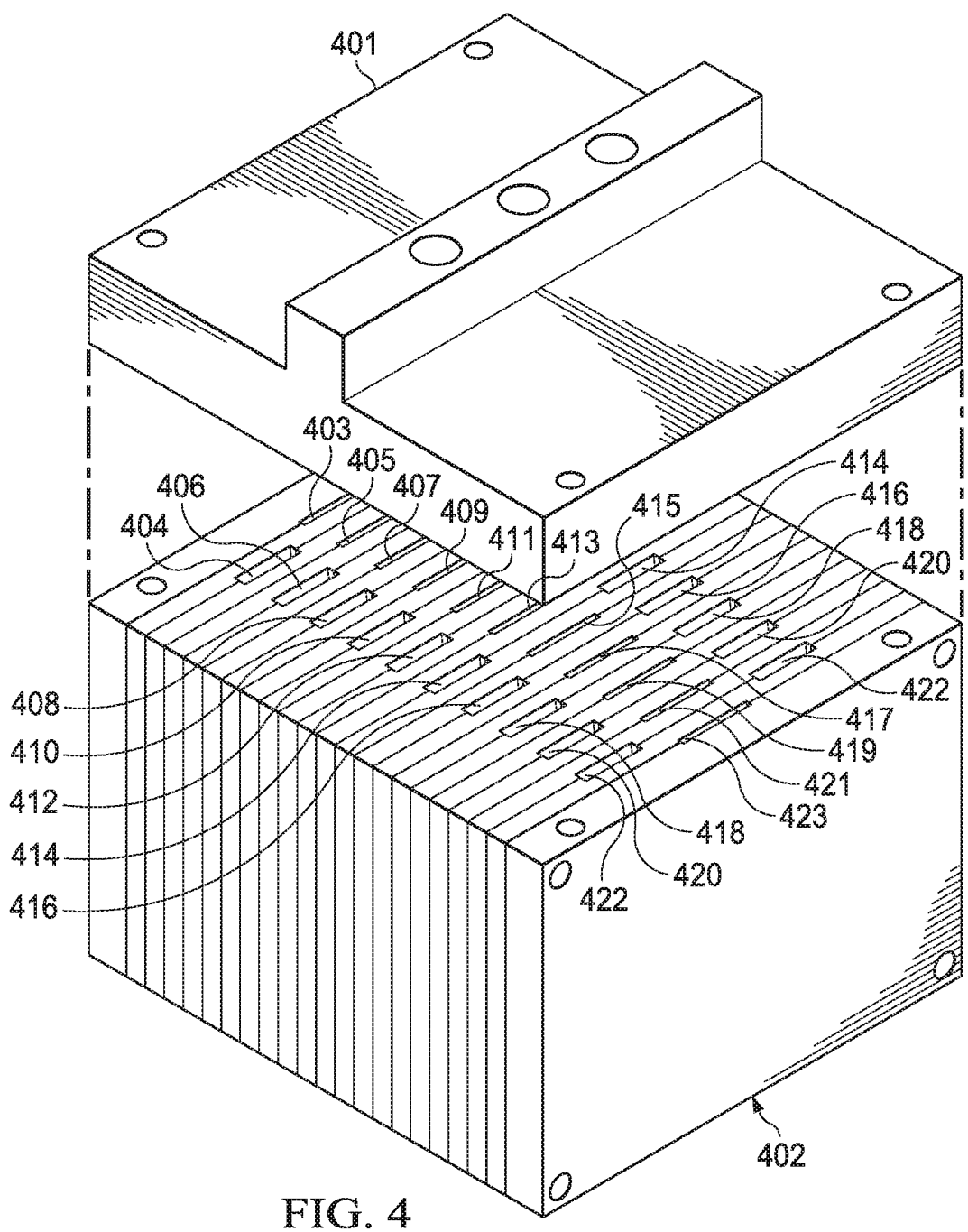
FIG. 4 is a perspective drawing showing the manifold separated from the stack of device blade units, with viewable entry apertures for ten liquid cryogen jets and eleven vapor cryogen jets. The drawing is not to scale.

FIG. 4 is a perspective drawing from above for an embodiment that shows the manifold 401 separated from the stack of device blade units 402, with viewable entry inlets for ten liquid cryogen jets 404, 406, 408, 410, 412, 414, 416, 418, 420, 422 and eleven vapor cryogen jets 403, 405, 407, 409, 411, 413, 415, 417, 419, 421, 423. The drawing is not to scale.

Figure 5:
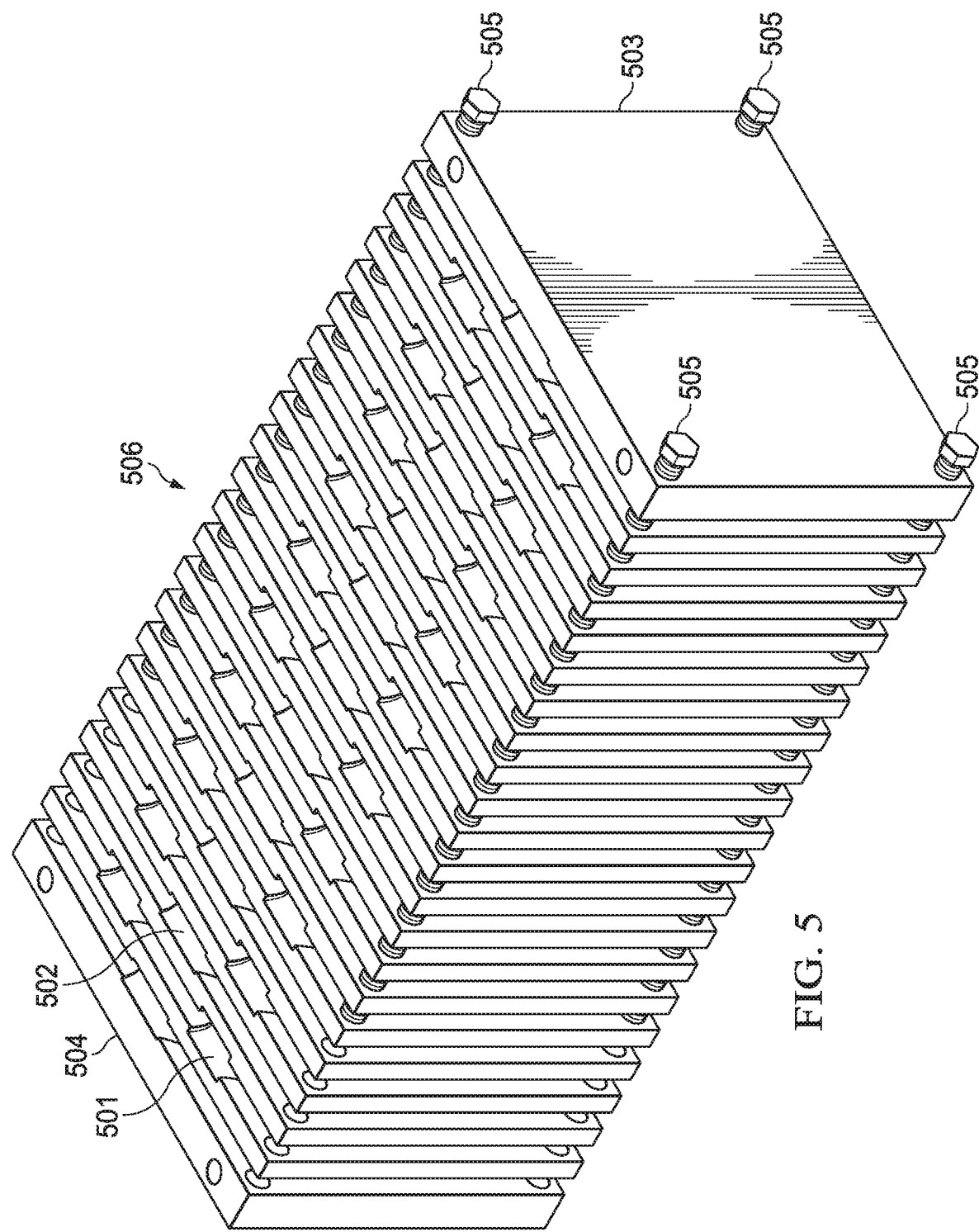
FIG. 5 is a perspective drawing showing an expanded view of a plurality of interior device blade units plus two exterior device blade units that show entry apertures for ten liquid cryogen jets and eleven vapor cryogen jets that are formed by the stackable device blade units. The drawing is not to scale.

FIG. 5 is an expanded perspective drawing of the manifold two-phase blade-jet assembly unit of the stack of a plurality of interior device blade units 506 to show arrangement of blades for supplying liquid cryogen to a plurality of liquid cryogen inlets 501 located on the stack of a plurality of interior device blade units 506 when the manifold two-phase blade-jet assembly unit is fully assembled. Vapor cryogen inlets 502 are also depicted. An exterior device blade unit 504 is located on each end of the plurality of interior blade units. The complete stack comprising a plurality of interior blade units 506 plus two exterior device blade units 503, 504 are held together to form a compact stack by a plurality of fasteners 505. The drawing is not to scale.

FIG. 6 is a perspective drawing of a blade that shows the lined pattern shape of one-half of a vapor cryogen channel, including of one-half of a single vapor cryogen supply inlet located on its uppermost edge 601, and the exit port for one-half of a vapor cryogen jet located at its lowermost edge 604. The opposite side of such blade would have the lined pattern shape of one-half of a liquid cryogen channel, including one-half of two liquid cryogen supply inlets located at its uppermost edge 602, 603 and the exit port (not shown) for one-half of a liquid cryogen jet located at its lowermost edge. The drawing is not to scale.

FIG. 7 is a perspective drawing of a blade that shows on its viewable side the lined pattern shape of one-half of a liquid cryogen channel, including of one-half of two liquid cryogen supply inlets located on its uppermost edge 702, 703, and the exit port for one-half of a liquid cryogen jet located at its lowermost edge 704. The opposite side of such blade would have the lined pattern shape of one-half of a vapor cryogen channel, including one-half of a single vapor cryogen supply inlet located at its uppermost edge 701, and the exit port (not shown) for one-half of a vapor cryogen jet located at its lowermost edge. The drawing is not to scale.

Now, considering together the drawings and descriptions for FIG. 5, FIG. 6, and FIG. 7, the types and arrangement of blades is as follows. Proceeding from the left, and following path beginning at the left-most end, and going to the right, is located a first exterior device blade that has one-half of a vapor cryogen channel machined into its surface that would be proximal to a surface of the first interior device blade unit when the stack is assembled. Proceeding then to the right, the first interior device blade unit would have one-half of a vapor cryogen channel machined into its surface that would be proximal to a surface of the first exterior device blade. These two one-half channels would be in contact with each other. Furthermore, identical patterns for the vapor cryogen channel are formed on these two device blade units, and as such would form a complete vapor cryogen channel. During operation of the ultra-fast cooling system this particular channel would generate a vapor cryogen jet that would impinge on a surface of a plurality of sample straws to be cooled. Again, proceeding to the right along the stack, the first interior device blade would have one-half of a liquid cryogen channel machined into its surface that is distal to the first exterior device blade. Again, proceeding to the right, the second interior device blade would have one-half of a liquid cryogen channel machined into its surface that is proximal to the first interior device blade. As such, these two one-half channels would form a complete liquid cryogen channel, and during operation of the ultra-fast cooling system would generate a liquid cryogen jet that would impinge on the surface of a plurality of sample holder units (e.g., sample straw units) to be cooled. Again, proceeding to the right, the second interior device blade would have one-half of a vapor cryogen channel machined into its surface distal to the first interior device blade. The third interior device blade would have also a vapor cryogen channel machined into its surface proximal to the second interior device blade. As such, these two one-half channels would form a complete vapor cryogen channel, and during operation of the ultra-fast cooling system would generate a vapor cryogen jet that would impinge on the surface of a plurality of sample holder units (e.g., sample straw units) to be cooled. If this method of orienting and stacking interior device blades is continued proceeding left to right in the stack, then alternate channels will form either a vapor cryogen channel or a liquid cryogen channel. If the interior stack is continued until the last interior device blade in a stack designed for use in an ultra-fast cooling device of the present disclosure has one-half of a vapor cryogen channel machined into its surface proximal to the second exterior device blade, and if the second exterior device blade has one-half of a vapor cryogen channel machined into its surface proximal to the last interior device blade, then, as such, the last channel to be would be a vapor cryogen channel, and generate a vapor cryogen jet that would impinge on the surface of a plurality of sample straws to be cooled. In summary, operation of the ultra-fast cooling system with an arrangement of a plurality of interior device blades and two exterior device blades as described above would generate a series of liquid cryogen jets and vapor cryogen jets, with each of such liquid cryogen jets flanked on both sides by a vapor cryogen. Furthermore, if the external lateral dimensional features of all exterior device blades and interior device blades are identical, and if the location of the vapor cryogen channel on each exterior device blade and interior device blade are identical and also properly centered on a surface, then all interior device blades can be identical and both exterior device blades can be identical. As one example, a stack of device blades might comprise twenty interior device blades plus two identical exterior device blades. As such, fabrication of the device blades can be facilitated. Even furthermore, methods of fabrication of one-half channels in interior device blades and exterior device blades are not limited to machining. The drawing is not to scale.

Figure 8:
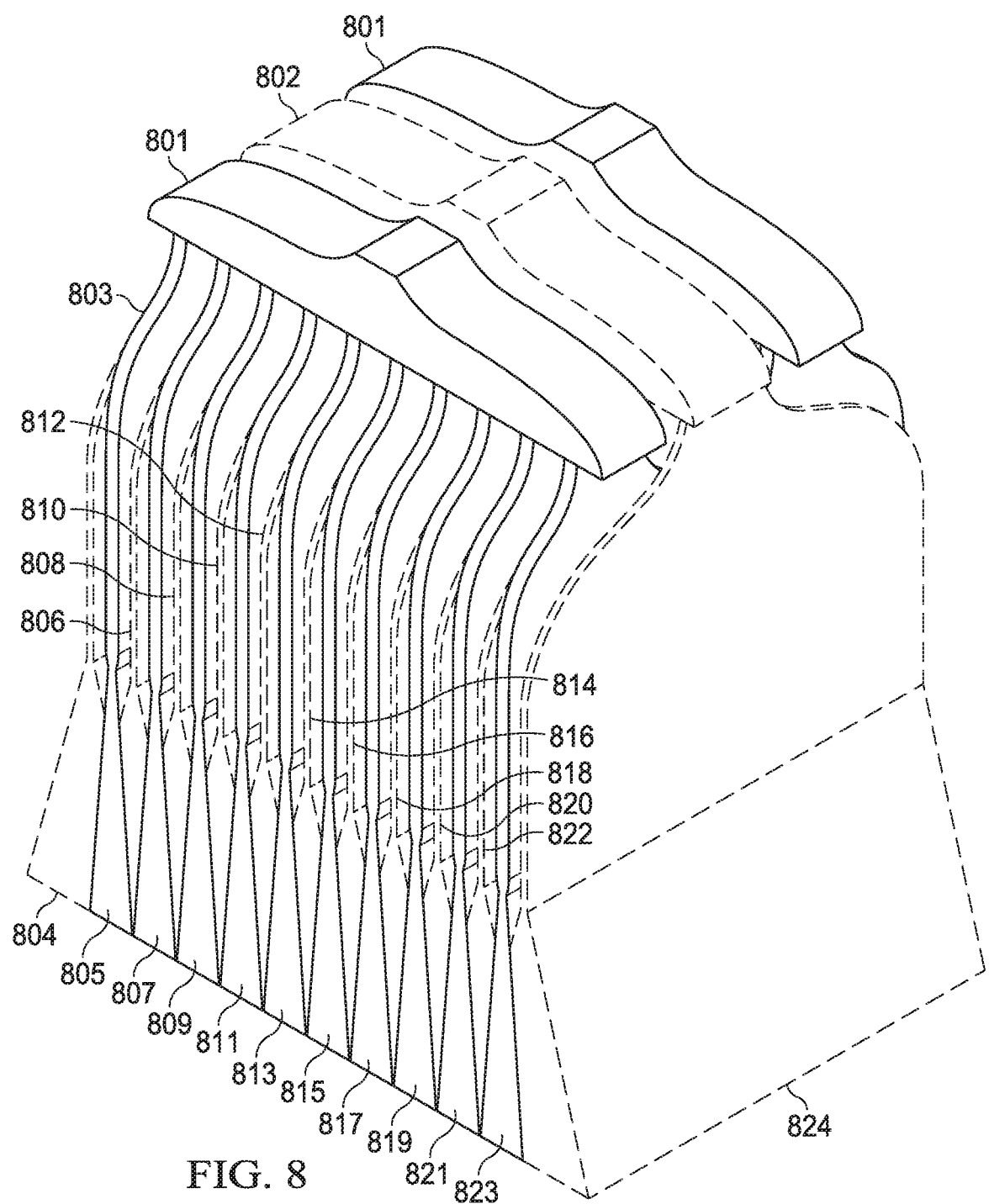
FIG. 8 is a perspective drawing showing paths for liquid cryogen and vapor cryogen through the manifold two-phase blade-jet assembly unit, to form ten liquid cryogen jets and eleven vapor cryogen jets. The drawing is not to scale.

FIG. 8 is a perspective drawing that shows paths for liquid cryogen and vapor cryogen, first through the manifold 801, 802, then the interior and end-cap device blades 803, and finally as emanating jets of liquid cryogen 805, 807, 809, 811, 813, 815, 817, 819, 821, 823 (solid lines) and vapor cryogen 804, 806, 808, 810, 812, 814, 816, 818, 820, 822, 824 (dashed lines), respectively. Of consequence, each liquid cryogen jet is flanked by two vapor cryogen jets that are located proximal to and on either side of all such liquid cryogen jets. The drawing is not to scale.

Figure 9:
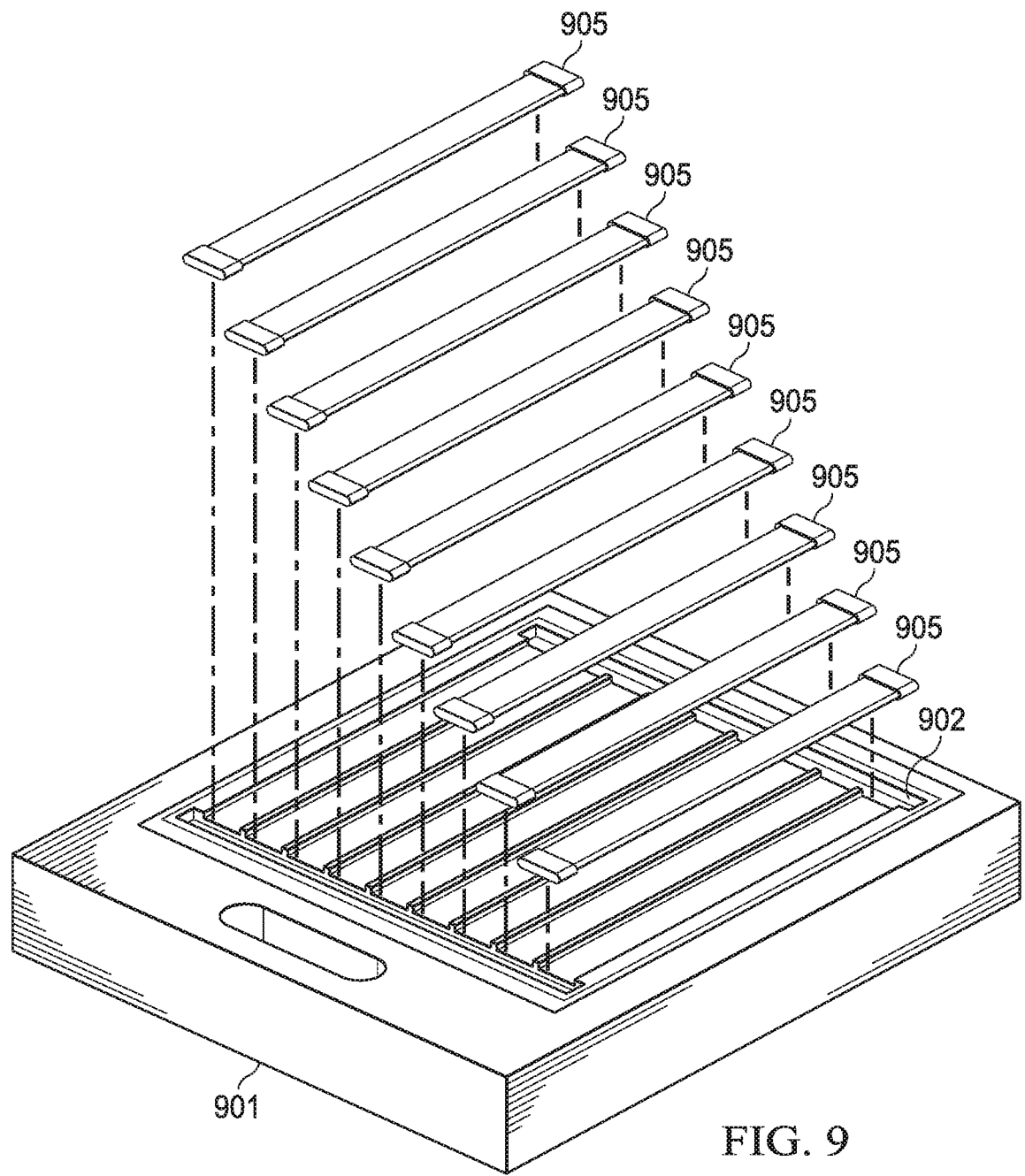
FIG. 9 is a schematic of a sample straw carriage reservoir unit that can contain a plurality of sample straw units. The drawing is not to scale.

FIG. 9 is a three-dimensional perspective drawing of the sample straw-carriage reservoir unit 901 that can contain a plurality of sample straw carriage units 902. Each sample straw carriage unit contains a multiplicity of sample straw units 905 in this illustration. For purposes of illustration only, to show how sample straw units are arranged to lie in the sample straw-carriage unit, several sample straw units are displayed at distances above the sample straw-carriage unit in which they would rest during operation of the ultra-fast cooling system. During the cooling process, liquid cryogen jets would impinge on the flat, top-most surface of the plurality of sample straw units shown, located in the sample straw-carriage unit. A thermocouple can be affixed to the sample straw-carriage unit. The sample straw-carriage unit is in thermal contact with liquid cryogen in the reservoir of the sample straw-carriage-reservoir unit. Of consequence, the sample straw-carriage-reservoir unit has capacity to hold an amount of liquid cryogen sufficient for maintaining the temperature of sample straw-carriage units contained therein at a temperature near or about the boiling point of liquid cryogen temperature for a time sufficient for all of the sample straw-carriage units to be transported to and immersed into a liquid cryogen storage unit. It is reasonable to expect that a human operator would locate a liquid cryogen storage unit in close proximity to the ultrafast cooling system of the present disclosure. The drawing is not to scale.

Figure 10:
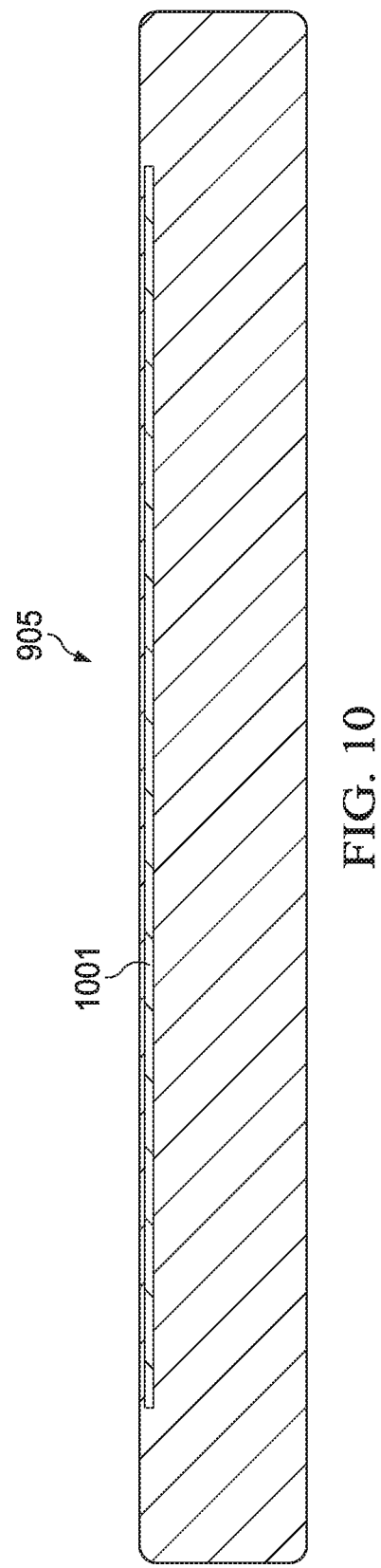
FIG. 10 is a schematic showing a sample straw unit. The upper portion of the sample straw that contains a thin upper layer to facilitate a high rate of heat transfer from the sample located on the interior of the straw to the liquid cryogen impinging on the thin upper layer. The drawing is not to scale.

FIG. 10 is a schematic that shows a cross-sectional, end-on view, of a sample straw unit that has a flattened top layer that is dimensionally thin. The top is thin to accommodate fast heat transfer when a plurality of liquid cryogen jets impinges downward on the sample straw unit. If a sample straw unit is constructed from a transparent material, such as quartz, then an operator can view the material contents of a sample straw unit during the loading process, to ensure that the straw is filled with a desired amount of sample material, and that such sample material is properly located and distributed within the sample straw unit. On the other hand, if a sample straw unit is to be constructed from a non-transparent material, such as stainless steel, then addition of at least one visible window, ostensibly located in the lower surface, or on a side surface, would allow an operator to view the sample contents of a sample straw unit during the loading process, to ensure that the sample straw unit is filled with a desired amount of sample material, and that such sample material properly located and distributed within the sample straw unit. End caps (not shown) are placed on each end of a loaded sample straw unit prior to cooling, to avoid sample contamination during the cooling process. The schematic is not to scale.

Figure 11:
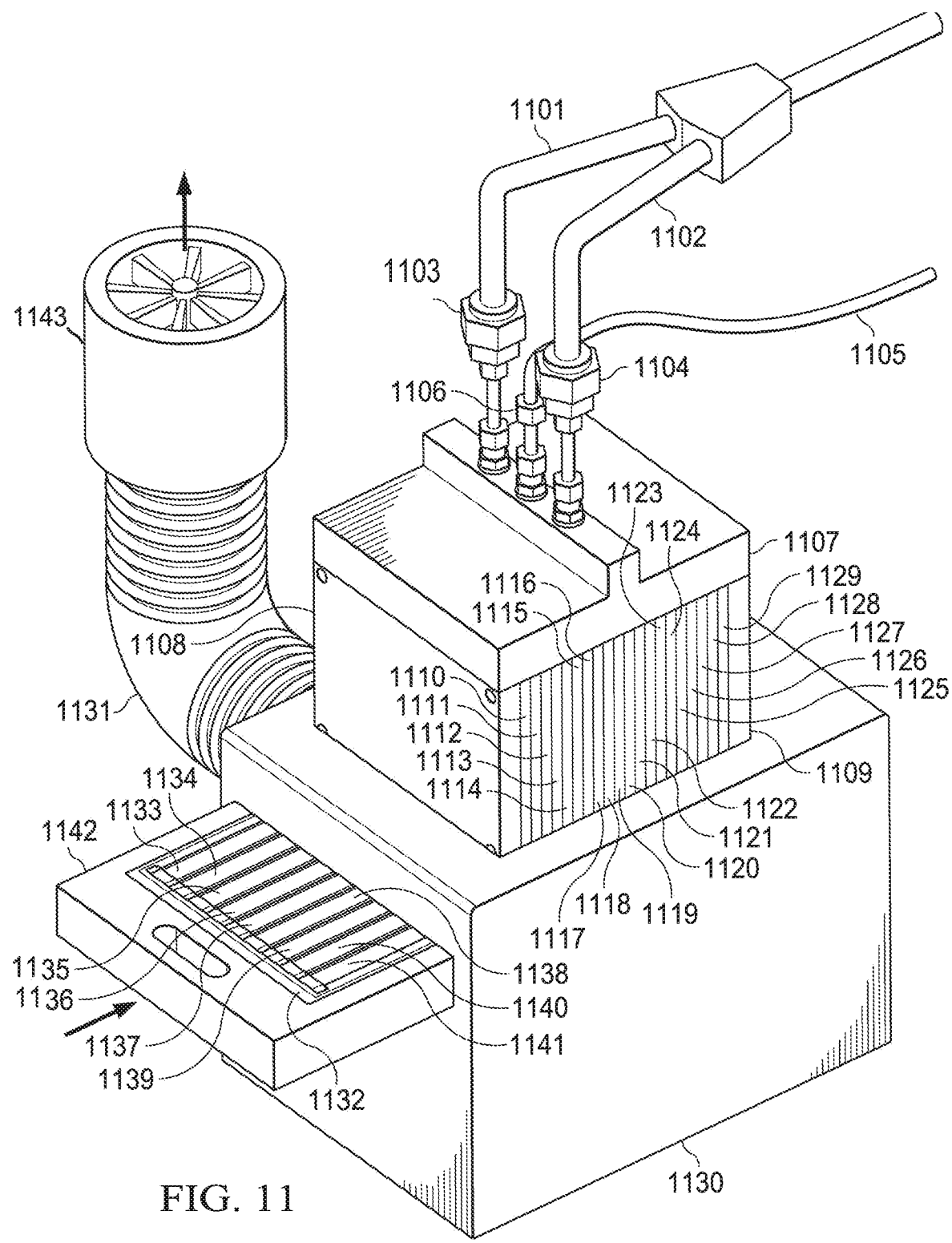
FIG. 11 is a perspective drawing showing a manifold two-phase blade-jet assembly unit with liquid cryogen and vapor cryogen supply tubes, a vapor cryogen shroud, and a removable sample straw carriage reservoir unit that can contain a plurality of sample straw units. The drawing is not to scale.

FIG. 11 is a perspective drawing of a manifold two-phase blade-jet assembly unit that shows the following: two liquid cryogen supply tubes 1101, 1102 that supply liquid cryogen to two liquid cryogen ports 1103, 1104 on the manifold 1107; one vapor cryogen tube 1105 that supplies vapor cryogen to a vapor cryogen port 1106 on the manifold; the manifold and upper portion of the stack comprising two exterior device blades 1108, 1109 and plurality of interior device blades 1110, 1111, 1112, 1113, 1114, 1115, 1116, 1117, 1118, 1119, 1120, 1122, 1123, 1124, 1125, 1126, 1127, 1128, 1129; a vapor cryogen shroud unit 1130 that surrounds the lower portion of the stack that can capture and exhaust vapor cryogen generated either before, during, and after a cooling procedure by means of an exhaust pipe 1131 with exhaust fan shown located on the end of the exhaust pipe 1143; and a sample straw-carriage unit 1132 loaded with a plurality of sample straw units 1133, 1134, 1135, 1136, 1137, 1138, 1139, 1140, 1141. The sample straw-carriage unit 1132 resides within a sample straw-carriage-reservoir 1142 through an opening in the vapor cryogen shroud 1130. The view of the sample straw-carriage-reservoir unit is obscured by the vapor cryogen shroud 1130. After cooling, the sample straw-carriage reservoir unit may be either maintained in a cold state within the ultra-fast cooling system period of time, including for an extended period of time. The sample straw-carriage-reservoir unit may also be transferred to a liquid cryogen storage unit (i.e., a cryogen dewar) for longer-term storage. The drawing is not to scale.

Figure 12A:
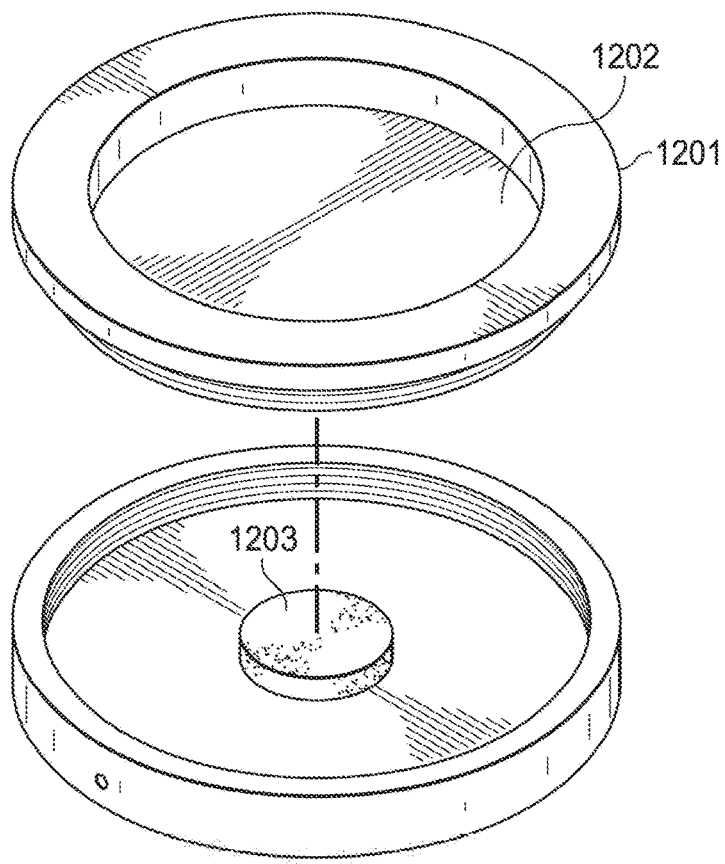
FIG. 12A-12C are schematics showing three views of a sample button unit for use with donor or bioartificial tissues. The drawings are not to scale.
Figure 12B:
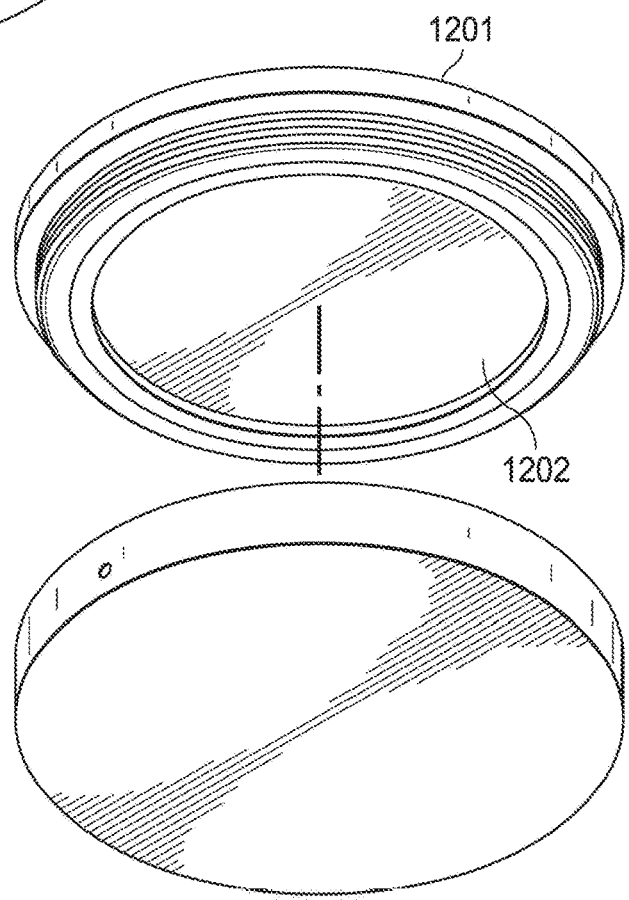
Figure 12C:
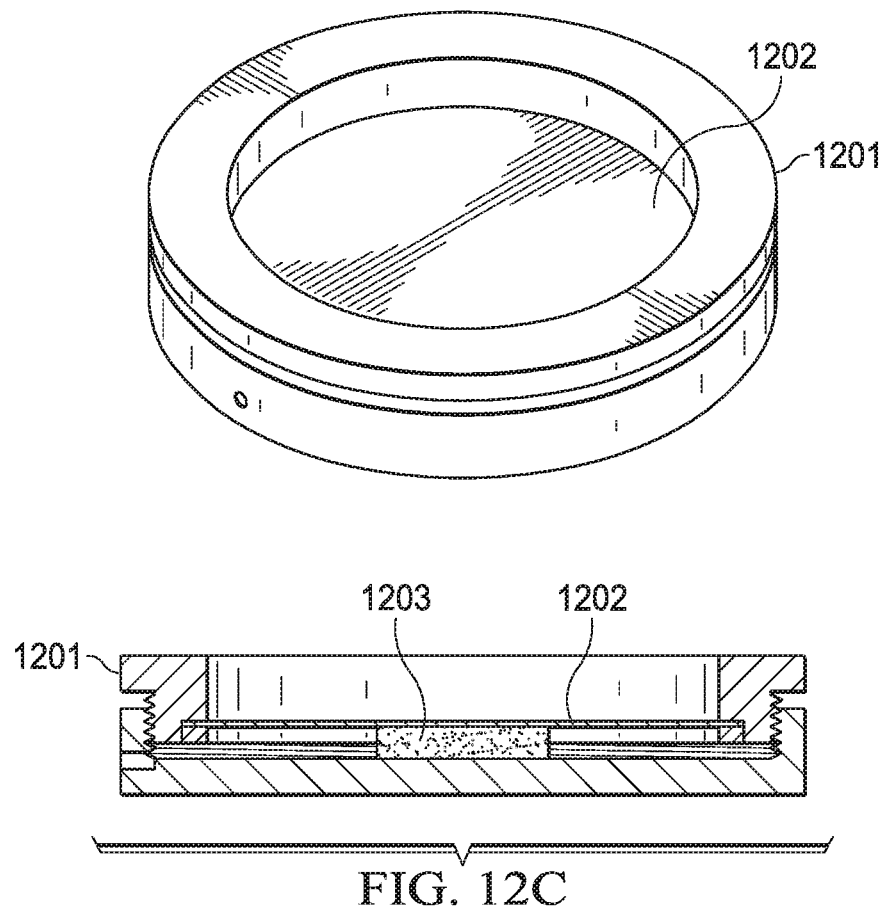

FIG. 12A-12C are schematics for an example embodiment of the present disclosure that shows three views of a sample button unit 1201 with a stainless steel film 1202 for use with donor or bioartificial tissues 1203. The drawings are not to scale.

Figure 13A:
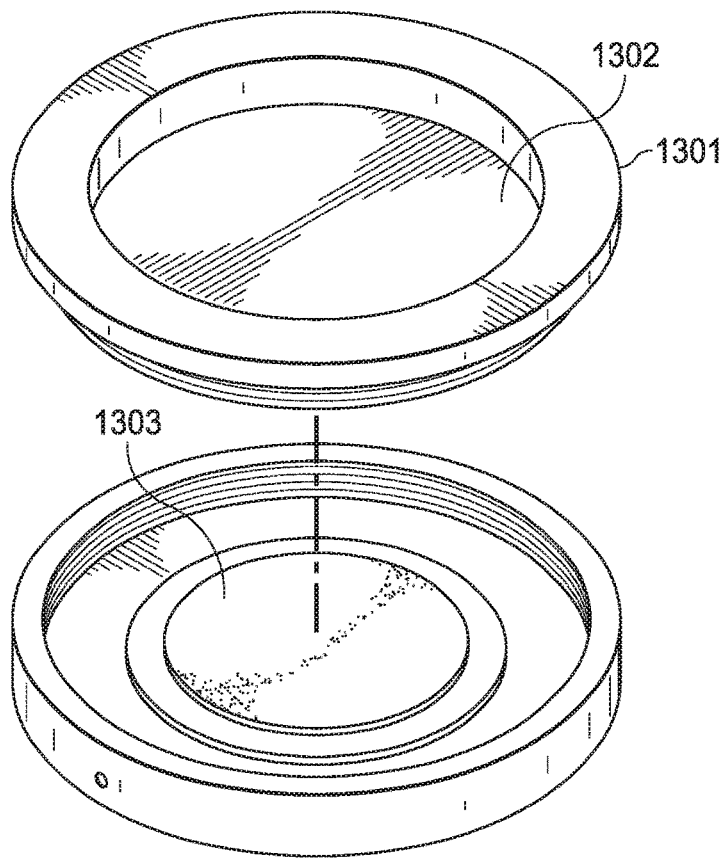
FIG. 13A-13C are schematics showing three views of a sample button unit for use with cell monolayer or multiple cell layer tissue. The drawings are not to scale.
Figure 13B:
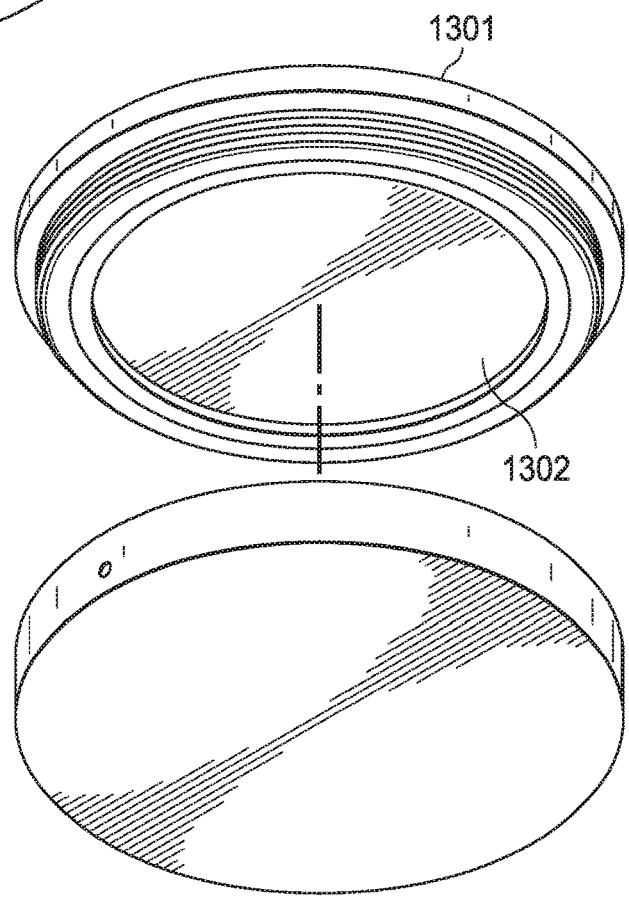
Figure 13C:
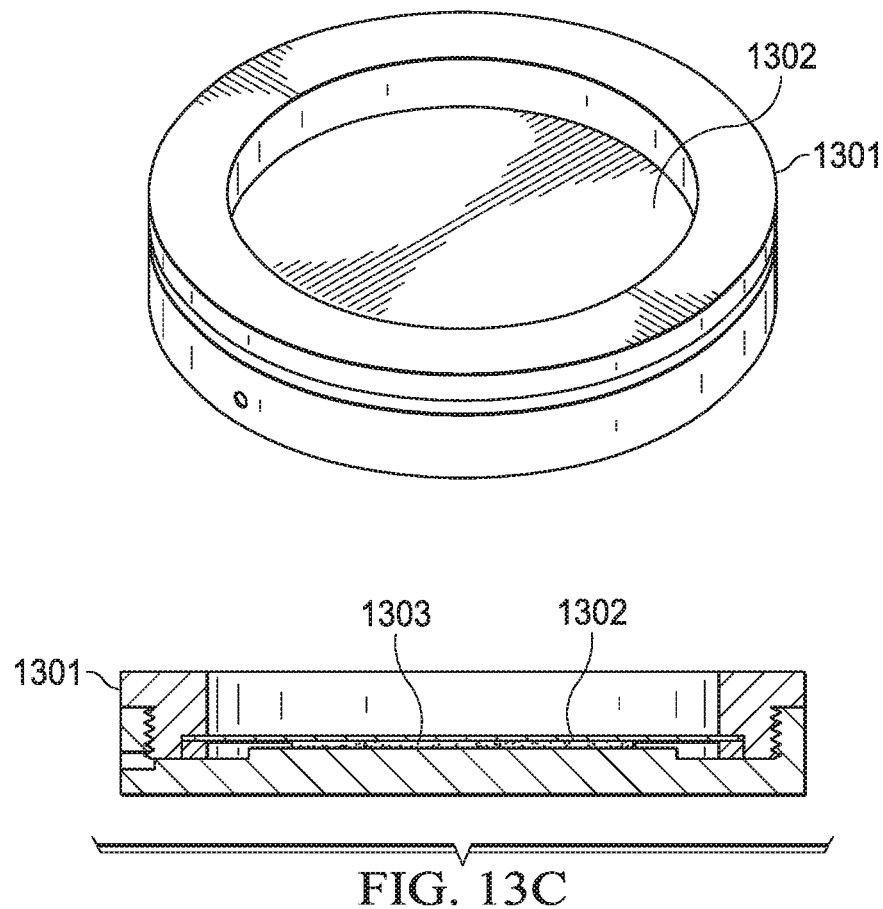

FIG. 13A-13C are schematics for an example embodiment of the present disclosure that shows three views of a sample button unit 1301 with a stainless steel film 1302 for use with cell monolayer or multiple cell layer tissue 1303. The drawings are not to scale.

FIG. 14A-14B is comprised of FIGS. 14A and 14B that show a manifold two-phase blade-jet assembly unit and cryogen supply lines. The unit contains two interior device blade units plus two exterior device blade units. In FIG. 14A, the unit is not in operation. The items in FIG. 14A are identified as follows: liquid cryogen supply line 1401; vapor cryogen supply line 1402; manifold two-phase blade-jet assembly unit 1403; one of two vapor cryogens exit ports 1404; single liquid cryogen exit port 1405. In FIG. 14B, the unit is in operation. The item in FIG. 14B identified is the liquid cryogen jet 1406. The two vapor cryogen jets, one located on each side of the liquid cryogen jet, are not visible. The cryogen is nitrogen. FIGS. 14C and 14D show a unit similar to the unit shown in 14A and 14B, and the unit is made by six interior device blade units and two exterior device blade units, to generate an array of three liquid nitrogen blade jets 1408, 1409 and 1410 and an array for four vapor nitrogen blade jets 1404, 1405, 1406 and 1407, and covers an area about three times larger than does a unit with only one liquid nitrogen blade jet.

FIG. 15A-15C shows a fully operational ultra-fast cooling system at several stages during operation. FIG. 15A is a view of the cooling system when totally enclosed in its vapor shroud 1501. FIG. 15B shows a cut-away view of the operational features, identified as follows: exhaust fan for vapors 1502; exhaust piping for vapor exhaust 1503; manifold ports for liquid cryogen and vapor cryogen 1504; sample-holder-carriage-reservoir unit 1505; door for inserting and removal of sample-holder-carriage-reservoir unit 1506; sample button unit 1507; sample button-carriage unit 1508; and motor for inserting and extracting sample-holder-carriage-reservoir unit into and from cooling cryogen jets 1509. FIG. 15C shows an alternative perspective to FIG. 15B. During a cooling operation of the embodiment during working status, the position of the sample transfer kit 1505 that contains the sample holder 1507, which in FIG. 15C is shown just outside the cooling region and in a position in a location immediately before (as well as immediately after) being cooled under the liquid and vapor jets, would have been moved quickly to a position under the two-phase blade-jet assembly unit 1511 for a short period of time (e.g., about 20 seconds for the cooling process to occur) so that the sample could be cooled by liquid jets (solid line) and vapor jets (dashed line) 1510. If the ultra-fast cooling system is used for storage also, then the sample can remain under the cooling jets. Otherwise, after retraction from the cooling stage, the sample holder-carriage reservoir unit may be used to provide cooled samples immediately for use, or transferred to a liquid cryogen storage unit (i.e., a cryogen dewar) for longer-term storage. The drawings are not to scale.

Figure 16:
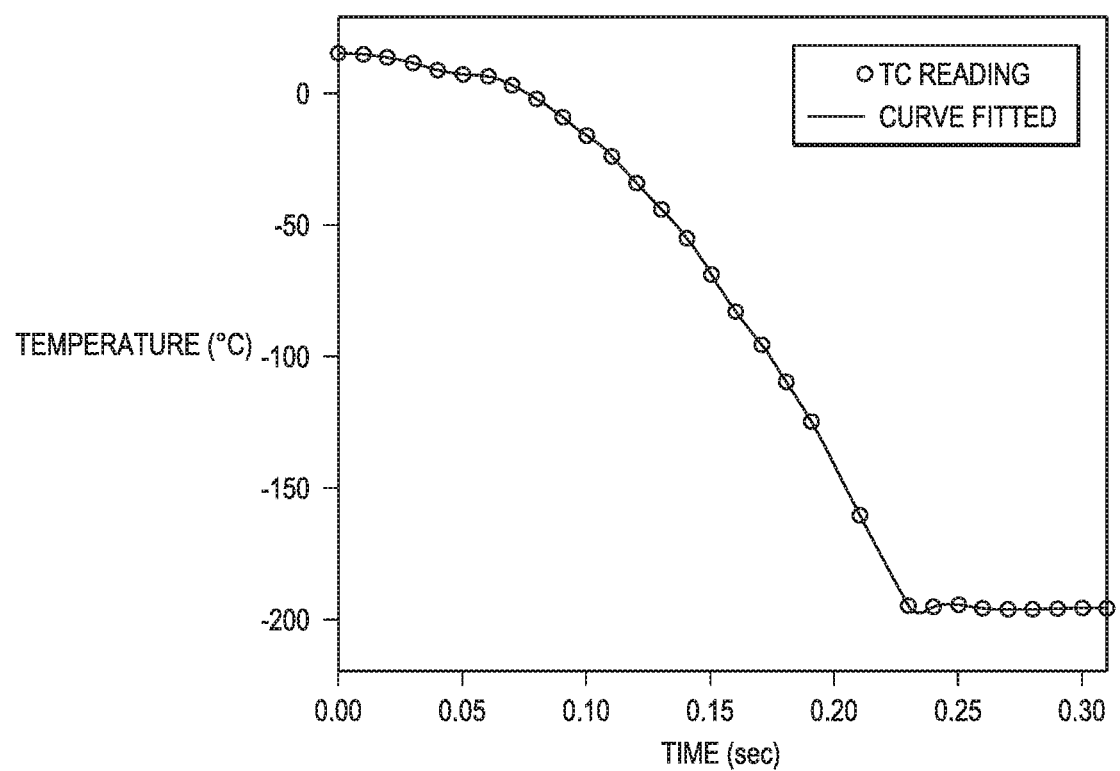
FIG. 16 is a graphical representation of temperature versus time for a small 200 μm diameter thermocouple probe during the process of being cooled from ambient room temperature (nominally 25 degrees C.) to nominally −196 degrees C. using an ultra-fast cooling system that contains a single liquid nitrogen jet and two vapor nitrogen jets.

FIG. 16 is a graphical representation of temperature versus time for a thermocouple probe during the process of being cooled from ambient room temperature (nominally 25 degrees C.) to nominally −196 degrees C. using the ultra-fast cooling system that contains a single liquid nitrogen jet and two vapor nitrogen jets.

Figure 17:
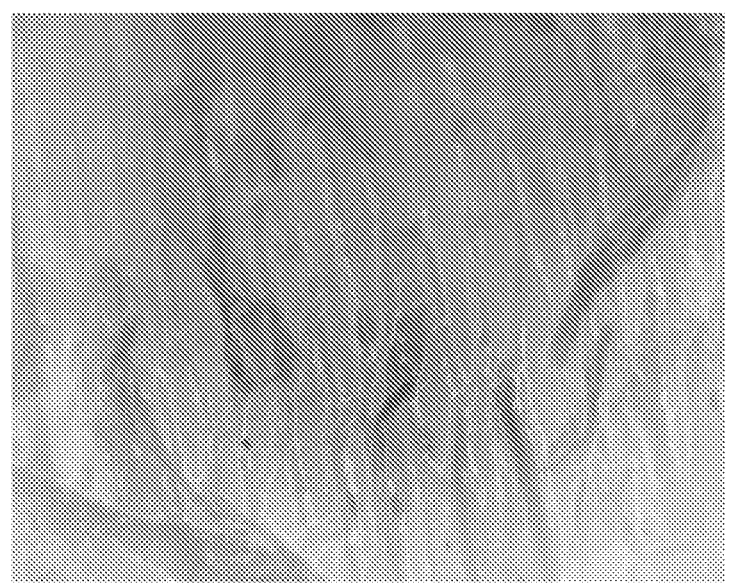
FIG. 17 is an optical image of the topmost layer of an onion tissue sample, i.e., the epidermal cell layer, taken through a microscope following cooling the onion tissue sample held in a sample button unit to nominally −196 degrees C. by placement under the stream of a liquid nitrogen jet generated by an ultra-fast cooling system, thawing in warm water (nominally 37 degrees C.) for 30 sec, staining, and taking the photograph. The epidermal cell layer was in thermal contact with a thin 20 microns thick stainless steel film onto which a liquid nitrogen jet and two vapor nitrogen jets impinged.
Figure 19D:
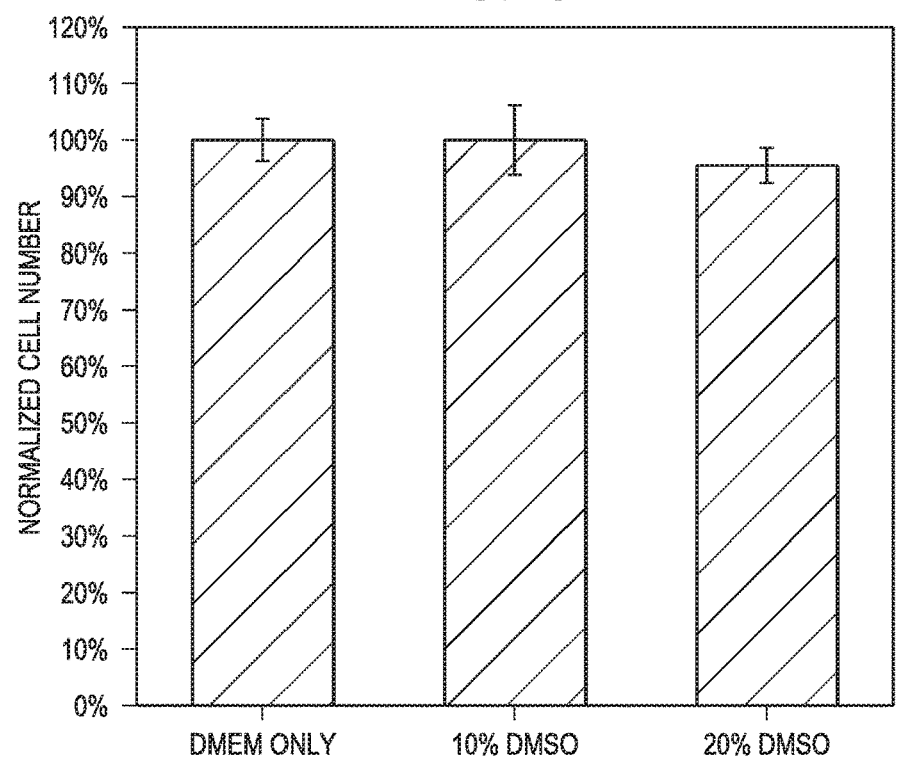
FIG. 19 shows differential interference contrast light microscopy directly on post-thaw corneal endothelia of: 19A. tissues without DMSO; 19B. tissues treated with 10% DMSO; 19C. tissues treated with 20% DMSO, taken through a microscope following cooling the corneal tissues held in a sample button unit to nominally −196 degrees C. by placement into the stream of a liquid nitrogen jet, plus two vapor jets, generated by an ultra-fast cooling system, thawing under a warm waterjet (nominally 37 degrees C.). The liquid jet and each of the vapor jets were in the shape of a blade. The post-thaw endothelial cell count compared to that from fresh tissues before cryopreservation, which was used as norm or 100% for each tissue, is demonstrated in 19D for the three treatments. The post-thaw endothelial cell heath, based on assessment of cell circularity as a surrogate marker using differential interference contrast light microscopy, was compared to that of fresh tissue in 19E.
Figure 19E:
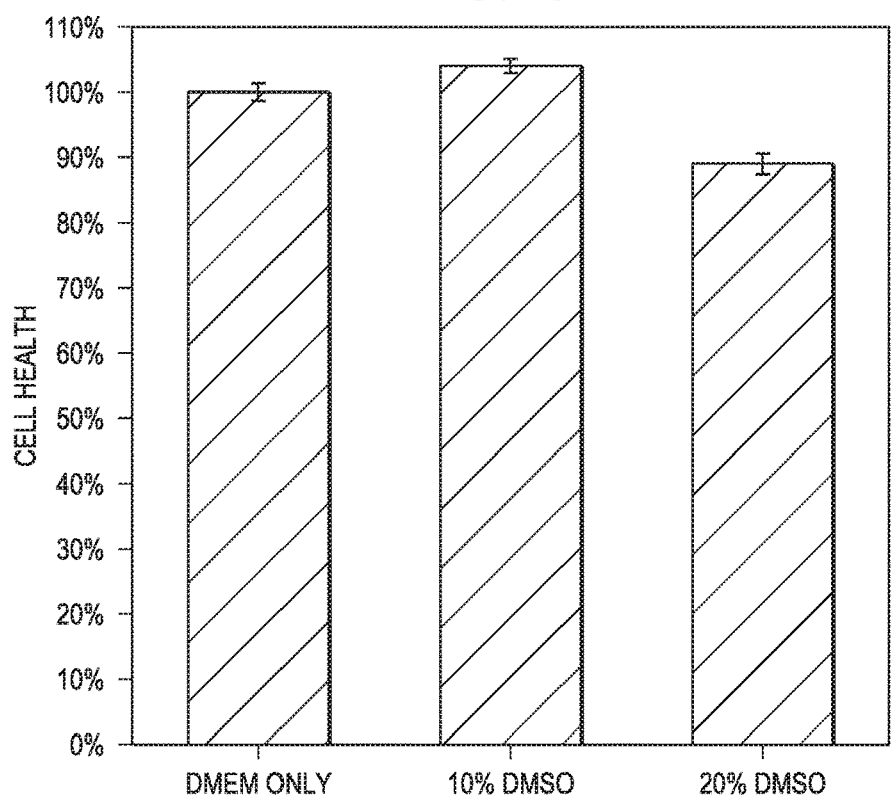

FIG. 17 is an optical image of the topmost epidermal cell layer of an onion tissue sample taken through a microscope following cooling the onion tissue sample to nominally −196 degrees C. by placement into the stream of a liquid nitrogen jet generated by the ultra-fast cooling system, then thawing in warm water (nominally 37 degrees C.) for 30 sec, staining, and then taking a photograph. The topmost epidermal cell layer of an onion tissue sample was in contact with a thin 20 microns thick stainless steel film onto which a liquid nitrogen blade jet and two vapor nitrogen blade jets impinged. As such, the topmost epidermal cell layer of the onion tissue sample cooled at a faster rate than the inner pulp region of the onion tissue sample.

FIG. 18 is an optical image of the topmost epidermal cell layer of an onion tissue sample taken through a microscope following slow-cooling of the onion tissue sample to nominally −196 degrees C. by dipping the onion tissue sample into an open bath liquid nitrogen, then thawing in warm water (nominally 37 degrees C.) for 30 sec, staining, and then taking a photograph.

FIG. 19A-19E illustrates the efficiency and uniformity of cooling of cryopreservation of corneal endothelia using the manifold two-phase blade-jet assembly unit manifold two-phase blade-jet assembly unit. The post-thaw endothelium integrity was demonstrated by differential interference contrast light microscopy directly on corneal endothelia of: 19A. tissues without DMSO; 19B. tissues treated with 10% DMSO; 19C. tissues treated with 20% DMSO. The post-thaw endothelial cell count was comparable to that from fresh tissues before cryopreservation, which was used as norm or 100% for each tissue, as demonstrated in 19D for the tree treatments. Uniformity of cooling is demonstrated by the uniformity of physical properties including, but not limited to, the post thaw endothelial cell count per unit area. The post-thaw endothelial cell heath, based on assessment of cell circularity as a surrogate marker using differential interference contrast light microscopy, was comparable to that of the fresh tissue, as demonstrated in 19E.

Figure 20A:
FIG. 20 Two examples of the post-thaw viability testing results of standard Trypan blue exclusion using an automatic cell counter (Countess II, Invitrogen) on a 10 μl mouse adipose derived mesenchymal stem cell suspension (20A) and a 10 μl human adipose derived mesenchymal stem cell suspension (20B). The cell suspension samples were held in a sample button unit and cooled to nominally −196 degrees C. by placement into the streams of three liquid nitrogen jets, plus four liquid vapor jets, generated by an ultra-fast cooling system, thawing under a warm water jet (nominally 37 degrees C.). Each of the liquid and vapor jets were in the shape of a blade.
Figure 20B:
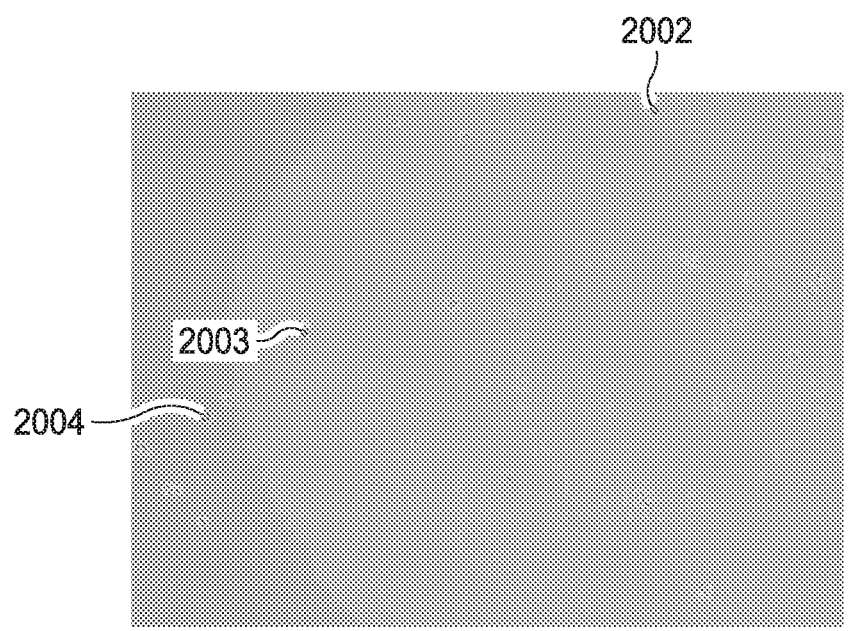

FIG. 20A-20B shows two examples of the post-thaw viability testing results of standard Trypan blue exclusion using an automatic cell counter (Countess II, Invitrogen) on a 10 μl mouse adipose derived mesenchymal stem cell suspension (20A) and a 10 μl human adipose derived mesenchymal stem cell suspension (20B). For FIG. 20A, the cell counter provided the statistics as: total cell density $4.46 \times 10^5$/ml, live cells 99%, and dead 1% as 2001 marked by the cell counter. For FIG. 20B, the cell counter provided the statistics as: total cell density $2.93 \times 10^5$/ml, live cells 94%, and dead 6% as 2002, 2003, and 2004 marked by the counter. Uniformity of cooling is also demonstrated by the uniformity of physical properties including, but not limited to, the post thaw endothelial cell count per unit area.

In an embodiment, a method of the ultra-fast cooling system for cooling biomaterials comprises the following steps:
 load biomaterials samples to be cooled into sample holder system;
 check sample holder system to ensure proper placement and loading of biomaterials;
 seal each sample holder system by attaching top lid, if required;
 affix thermocouple to sample holder systems or to individual sample holders, as can be selected;
 activate exhaust system for vapor cryogen, for safety purposes;
 adjust pressures and flows for liquid cryogen and for vapor cryogen to manifold two-phase blade-jet assembly unit to achieve optimal cooling rate;
 insert sample holder system under liquid cryogen jets and vapor cryogen jets generated by manifold two-phase blade-jet assembly unit;
 cool samples at an optimal ultra-fast rate for recommended time;
 remove sample holder system; and
 store cooled biomaterial sample at desired temperature, including storage in a liquid cryogen if desired.

The step of affixing a thermocouple to sample holder systems or to individual sample holders is optional.

The improved ultra-fast cooling system utilizes a liquid cryogen and vapor cryogen for use with samples having a combination of large area, thin, and with significant mass-on the order of, but not limited to, about one gram (gm). Such a disclosure could be used in many applications including use in processing and preservation of materials that includes but is not limited to cryopreservation of biomaterials. For clarity, the improved ultrafast cooling system of the present disclosure for use in cryopreservation of biomaterials differs from those for use in cryo-electron microscopy. The improved ultra-fast cooling system can be used to improve cryopreservation efficiency in biomaterials, such as large stocks of cells, cell cultures, tissues, and organs.

The improved ultra-fast cooling system can be used to improve the process of cryopreservation of biomaterials with use of either very little cryopreservation media or no cryopreservation media. In addition, the improved ultra-fast cooling system of the present disclosure can be used to improve cryopreservation of biomaterials with large throughput and for improving cryopreservation of biomaterials with large surface areas. The improved ultra-fast cooling system can separate thin layers of material with differing compositions that have been formed as one solid material by a process of ultra-fast cooling. An example would be a crystalline layer comprising one composition having been synthesized by a process such as chemical vapor deposition on a substrate comprising a composition that differs from the synthesized material. For some applications, separation of the synthesized layer from the substrate layer would yield a thin crystalline film that would have applications and usefulness that would not exist for such thin crystalline film if still intact with the substrate on which it was grown.

Cooling rates are sufficient to cryopreserve biomaterials, and for use in diagnostic cytology and tissue fixation applications.

EXAMPLES

Example 1

A thermocouple probe was cooled from room temperature (ambient) to −196 degrees C. (77 K) using an ultra-fast cooling system the present disclosure that contains a single liquid nitrogen blade jet and two vapor nitrogen blade jets. FIG. 16 is a graphical representation of temperature versus time for a thermocouple probe during the process of being cooled from ambient room temperature (nominally 25 degrees C.) by placement into the stream of a liquid nitrogen jet generated by an example embodiment of an ultra-fast cooling system the present disclosure that contains a single liquid nitrogen jet and two vapor nitrogen jets. The final temperature is nominally −196 degrees C. Equilibrium occurred within 0.23 sec. The diameter of the thermocouple tip is about 200 microns, and it is the smallest commercially available thermocouple. For the cooling process of the thermal couple, the cooling time from −20 degrees C. (the typical nucleation temperature of intracellular water) to −196 degrees C. is approximately 0.13 sec, with a cooling approaching $10^5$ K/min ($8 \times 10^4$ K/min). For a thermocouple of the same size cooled in an evaporating liquid cryogen, e.g., by directly plunging into a liquid nitrogen pool, the evaporation of liquid nitrogen generated a vapor coat, and the cooling rate is generally on the order of $10^4$ K/min. Therefore, the fact that the liquid nitrogen flow is non-evaporating is demonstrated by the relatively high cooling rate of the thermal couple. Although it is technically difficult to measure the cooling rate of a much thinner sample due to the limitations of the size of the thermocouples, it can be estimated that if the sample thickness or size is on the order of 10 μm, the cooling rate in the same temperature region should approach $10^6$ K/min when the same cooling method is used. Such estimation indirectly demonstrates the efficiency of using non-evaporating liquid nitrogen flow to achieve the desired ultra-fast cooling rate, i.e., on the order of $10^6$ K/min for biomaterial samples whose thickness is on the order of 10 μm (e.g., cells, cell sheets, artificial tissues made by one or several layers of cells). The estimation is also valid for biomaterial samples with a surficial portion that is critical for cryopreservation and also about 10 μm in thickness, e.g., corneal endothelia, retina pigment epithelia, and artificial tissues with a surface as one or several layers of cells. Such a high cooling rate can achieve direct vitrification of the intracellular solutions. Vitrification is a solidification procedure in the absence of crystallization. Based on previous theoretical predictions made using dynamic models [1,2,3], as well as in our own study on melting points and vitrification tendency of intracellular solutions [4], cooling rates as high as $10^6$ K/min are required to vitrify intracellular solutions without using permeating cryoprotectants. For pure water or extracellular solutions without any permeating cryoprotectant or macromolecule, $10^7$ K/min or higher is required for their vitrification. The difference in cooling rates required for vitrification of intracellular vs. extracellular solutions is caused by the high volume ratio of macromolecules (approximately 50%) in the cytoplasm, and the fact that these molecules significantly lower the critical cooling rate for vitrification, as previously demonstrated [4]. Consequently, a cooling rate on the order of $10^6$ K/min potentially prevents any cell damage due to intracellular ice formation. In the meantime, a cooling rate on the order of $10^6$ K/min also significantly reduces ice crystal size in the extracellular solutions, which minimizes cell damage due to extracellular formation. Therefore, the use of a cooling rate higher than $10^6$ K/min will achieve ideal cell cryopreservation without the need for cryoprotectants by preventing intracellular ice formation and minimizing extracellular ice formation. When the cooling rate is about $10^5$ K/min and there is no cryoprotectant used, the intracellular ice formation happens and causes mechanical damage to cell organelles and may cause the loss of some of the cell functions, but due to the presence of intracellular macromolecules, partial vitrification can still be achieved. Therefore, even without cryoprotectant, some cell structures can be well maintained at $10^5$ K/min cooling rates, e.g., plasma membranes, so that cell or tissue morphology can be preserved, which is still practically useful for numerous applications, e.g., diagnostic cytology, and tissue fixation.

Example 2

A small sample of onion tissue was excised from an onion. More specifically, the onion tissue sample comprised onion pulp tissue whose topmost layer was an epidermal cell layer. The mass of the onion tissue sample was nominally one gram. The onion tissue sample was cooled from room temperature (ambient) to −196 degrees C. (77 K) using an ultra-fast cooling system of the present disclosure that contained a single liquid nitrogen blade jet and two vapor nitrogen blade jets. No cryoprotectant was used. The liquid nitrogen blade jet was directed vertically downward and impinged on the top of the sample chamber, thereby impinging on a thin stainless steel foil 20 microns in thickness. The epidermal cell layer of the onion tissue sample was in good thermal contact with the stainless steel foil. Heat was extracted from the onion tissue sample. Heat was extracted most rapidly from the topmost surface layer of the onion tissue sample, i.e., through the epidermal cell layer of the onion tissue sample. FIG. 17 is an optical image of the epidermal cell layer of the onion tissue sample taken through a microscope following cooling of the onion tissue sample to nominally −196 degrees C. by placement into the stream of a liquid nitrogen jet generated by an example embodiment of an ultra-fast cooling system the present disclosure that contains a single liquid nitrogen jet and two vapor nitrogen jets. The final temperature reached by the onion tissue layer sample following exposure to the liquid nitrogen jet for about 20 sec was nominally −196 degrees C. After the 20 sec exposure, the sample cavity containing the onion tissue layer sample was quickly immersed in warm water (nominally 37 degrees C.) for 30 sec. The onion tissue layer sample was then removed from the cavity, excess water removed immediately with an absorbent tissue, followed immediately with application of a thin layer of Trypan blue stain. The top of the onion layer tissue sample; namely, the epidermal cell layer, was then viewed under low-power microscope to assess viability of cells, and the photograph taken. Each dark spot in the image identifies a dead cell in the epidermal cell layer. Few dead cells are visible. Hence, the optical image shows a high rate of survivability-most cells in the epidermal cell layer of the onion tissue sample were preserved, and the pattern of cells on the epidermal cell layer of the onion tissue sample was also preserved. Uniformity of cooling of the epidermal cell layer is demonstrated by the maintained uniformity of physical properties of the epidermal cell layer including, but not limited to, the post thaw endothelial cell count per unit area. Uniformity of cooling of the epidermal cell layer is also demonstrated by the uniformity of surface physical properties of the post thaw of the epidermal cell layer sample.

For an epidermal cell layer in an onion tissue sample, a high rate of survivability of cells with no cryoprotectant is not possible in the absence of vitrification, or at least partial vitrification. The morphology of the cells within the epidermal cell layer in the onion tissue layer did not change dramatically. Thus, the high rate of survivability within this epidermal cell layer with no cryoprotectant as demonstrated in this experiment can occur only if the epidermal cell layer of the onion tissue sample was either vitrified, or partially vitrified, during the rapid cooling process. Most likely, the epidermal cell layer of the onion tissue sample was partially vitrified, accompanied by the presence of small ice crystals. This experiment demonstrates that an example embodiment of an ultra-fast cooling system the present disclosure that contains a single liquid nitrogen jet and two vapor nitrogen jets has capability for generating sufficient cooling rate to vitrify the epidermal cell layer in the onion tissue sample. Such vitrification of the topmost surface layer of the onion tissue sample can only occur if the topmost surface layer of the onion tissue sample is cooled at a rate of at least about $10^5$ K/min.

It is reasonable to expect that other embodiments of the present disclosure that contain a larger number of liquid nitrogen jets and surrounding vapor nitrogen jets would also possess sufficient cooling rate to vitrify cells in an onion tissue layer at a rate of at least about $10^5$ K/min, and even more likely would possess sufficient cooling rate to vitrify cells in an onion tissue layer at a rate of at least about $10^6$ K/min.

Also, it is reasonable to expect other embodiments of the present disclosure that contain a larger number of liquid nitrogen jets and surrounding vapor nitrogen blade jets would also possess sufficient cooling rate to vitrify biomaterials and other materials at a rate of at least about $10^6$ K/min.

Furthermore, it is reasonable to expect other embodiments of the present disclosure that contain a larger number of liquid nitrogen jets and surrounding vapor nitrogen jets would also possess sufficient cooling rate to vitrify biomaterials and other materials at a rate of at least about $10^6$ K/min, wherein such biomaterials comprise those in the list including, but not limited to, human biomaterials, proteins, peptides, cells, stem cells, antibodies, neurons, human tissue, organs, cornea, skin, retina, eggs, sperm, embryos, body fluids, blood, serum, lymph fluid, animal tissue, plant biomaterials, plant tissue, germ plasma, pollen, plant sap, and bioengineered tissue.

Even furthermore, it is reasonable to expect other embodiments of the present disclosure that contain a larger number of liquid nitrogen jets and surrounding vapor nitrogen jets would also possess sufficient cooling rate to vitrify biomaterials and other materials at a rate of at least about $10^6$ K/min, wherein such biomaterials comprise those in the list including, but not limited to, human biomaterials, proteins, peptides, cells, stem cells, antibodies, neurons, human tissue, organs, cornea, skin, retina, eggs, sperm, embryos, body fluids, blood, serum, lymph fluid, animal tissue, plant biomaterials, plant tissue, germ plasma, pollen, plant sap, and bioengineered tissue, with their culturing or holding medium.

Furthermore, is also reasonable to conclude that embodiments of the ultra-fast cooling system of the present disclosure would possess a sufficient cooling rate to vitrify, or partially vitrify, materials in the list including, but not limited to, biomaterials, cells, tissues, retinas, organic materials, inorganic materials, single crystal materials, polycrystalline materials, and materials having dissimilar layers that possess a surface area in the range about $10^{-4}$ cm$^2$ to at least about 1000 cm$^2$, and having mass in the range about 1 nanogram to at least about 10 grams.

Even furthermore, is also reasonable to conclude that embodiments of the ultra-fast cooling system of the present disclosure would possess a sufficient cooling rate wherein the cooling rate is at least between about $10^3$ K/min. and to at least about $10^6$ K/min. It is also reasonable to conclude that embodiments of the ultra-fast cooling system of the present disclosure would possess a cooling rate that is sufficiently uniform to vitrify, or partially vitrify, biomaterials in the list including, but not limited to human biomaterials, proteins, peptides, cells, stem cells, antibodies, neurons, human tissue, organs, cornea, skin, retina, eggs, sperm, embryos, body fluids, blood, serum, lymph fluid, animal tissue, plant biomaterials, plant tissue, germ plasma, pollen, plant sap, and bioengineered tissue, with CPAs or with a low concentration of CPAs.

Example 3

A different small onion tissue sample excised from the same onion tissue layer (i.e., from the same onion tissue leaf, or scale) as was used above in Example 2. This onion tissue sample was cooled from room temperature (ambient) to −196 degrees C. (77 K); however, a different cooling method was utilized. No cryoprotectant was used. FIG. 18 is an optical image of this particular onion tissue sample taken through a microscope following slow-cooling of the onion tissue sample to nominally −196 degrees C. by dipping the onion tissue sample into an open bath liquid nitrogen. The onion tissue sample was bare, with no surrounding cryoprotectant. The mass of the onion tissue sample was nominally one gram. The onion layer was enclosed in a sample cavity that had a 20 microns thick sheet of stainless steel as its upper layer. After 20 sec exposure, the sample cavity containing the onion tissue was immediately immersed in warm water (nominally 37 degrees C.) for 30 sec. The onion tissue sample was then removed from the cavity, excess water removed immediately with an absorbent tissue, followed immediately with application of a thin layer of Trypan blue stain. The onion tissue sample was then viewed under low-power microscope to assess viability of cells, and a photograph taken. The optical image in the photograph shows a low rate of survivability-most cells were not preserved, and the pattern of cells on the surface was also not preserved. Notably, the morphology of the cells in this onion tissue sample changed dramatically, as indicated by the appearance of large structures in many places on the surface of the onion tissue sample. Comparison of the observed high number of cells that survived of the epidermal cell layer when the onion tissue sample was cooled by the ultra-fast cooling system, with the observed low number of cells that survived of the epidermal cell layer when cooled by dipping the onion tissue sample in liquid nitrogen as shown in this example, clearly demonstrates the cooling rate achieved by the ultra-fast cooling system was greater when cooled by the ultra-fast cooling system of the present invention than the rate achieved by dipping in liquid nitrogen. Furthermore, a lack in uniformity of cooling is also demonstrated by the lack of uniformity of the epidermal cell layer, e.g., large structure morphologic features that were introduced, of surface physical properties of the post thaw sample of the epidermal cell layer.

Example 4

Small samples excised from pig corneas were cooled from room temperature (ambient) to −196 degrees C. using an ultra-fast cooling system of the present invention that contains a single liquid nitrogen blade jet and two gas nitrogen blade jets. Pig corneas were processed and cut into approx. 0.5 cm×0.5 cm×0.5 cm pieces, and each piece maintains a full layer of endothelium, i.e., a single layer of corneal endothelial cells of approximately 10 microns in size, on one surface. The tissues are first placed in standard holding media, Dulbecco's Modified Eagle Media (DMEM), at 4 degrees C. A sample holder was made with a holding cavity of 0.5 cm in depth and with a 20 microns thick sheet of stainless steel as its cover sheet. Each piece of the corneal tissue sample, without any cryoprotectant, was enclosed in each sample holder. The corneal endothelium of each tissue faced to the cover sheet and directly contacted its inner surface, to achieve maximum cooling rate possibly provided by the liquid nitrogen jet for the endothelium and prevent exposure of the cells to liquid nitrogen flows. The samples were cooled by being placed directly under the liquid nitrogen blade jet with the cover sheet surface vertically receiving the flow of the jet. The cooling rate for the endothelial cells is technically difficult to measure due to the small cell size, but it can be estimated to approach the order of $10^6$ K/min; as demonstrated in FIG. 15, for a 200 microns size sample, the cooling time from −20 degrees C. (the typical nucleation temperature of intracellular water) to −196 degrees C. is approximately 0.13 sec, with a cooling approaching $10^5$ K/min, so for the 20 micron thick cover sheet (10% of the size of the thermal couple), the cooling rate of the surface of the tissue directly contacting the inner surface of the sheet should approach $10^6$ K/min. That level of high cooling rate can result in direct vitrification of the intracellular solutions without using any cryoprotectant. Final temperature for the tissues was nominally −196 degrees C. After 10 sec exposure, the sample cavity was immediately thawed under a 37 degrees C. water jet. Another two treatments were created by using corneal tissue pieces of the same size, with additional 10% and 20% dimethyl sulfoxide (DMSO) in the DMEM media, respectively, and cooled and warmed in the same approach. The post-thaw quality of the corneal endothelia was evaluated by quantification of endothelial cell number based on differential interference contrast light microscopy. The cell health was assessed by using cell circularity as a surrogate marker using differential interference contrast light microscopy. The comparison of the outcome of three treatments is shown in FIG. 19A-19E. As demonstrated in FIG. 19A-19E, the post-thaw integrity of corneal endothelium from all three treatments (19A. without DMSO; 19B. with 10% DMSO; 19C. with 20% DMSO) is well maintained from the ultra-fast cooling process. The cell viability (19D) and health (19E) was comparable to readings of the fresh corneas, though the third treatment using 20% DMSO impacted the cell viability due to toxicity generated by the relatively high concentration of DMSO. That efficiency solves the long existing issues in traditional corneal cryopreservation approach, that typically results in partial detachment of endothelium and 30-50% cell death. According to the comparisons between outcomes of the three treatments, wherein the DMSO free treatment yielded approximately the same post-thaw endothelial integrity, viability and health as the other treatments using DMSO, it was demonstrated the efficiency of the capability of the present invention in achieving corneal tissue cryopreservation without any cryoprotectant. Uniformity of cooling of the endothelial cell layer is demonstrated by the uniformity of physical properties of the endothelial cell layer including, but not limited to, the post thaw endothelial cell count per unit area of the endothelial cell layer. Uniformity of cooling is also demonstrated by the uniformity of surface physical properties of the post thaw sample of the endothelial cell layer.

Example 5

Samples of stem cell suspensions were cooled from room temperature (ambient) to −196 degrees C. using an ultra-fast cooling system of the present invention that contains the array of three liquid nitrogen blade jets and four gas nitrogen blade jets, without any cell permeating cryoprotectant (e.g., DMSO). Mouse and human adipose derived mesenchymal stem cells (mMSC and hMSC, respectively) suspended in their culture media (DMEM media with fetal bovine serum) with a cell density higher than $10^5$ cells/ml were prepared. A sample holder was made with a holding cavity of 20 µm in depth and 3 cm in diameter and with a 110 µm thick sapphire chip as its cover sheet. To prevent the adhesion of cells to the highly hydrophilic sapphire and cavity surfaces, 10% polysaccharide (Ficoll) was added to the cell suspension. Each sample was produced by sealing 10 µl mMSC or hMSC cell suspension supplied with 10% Ficoll into the 20 µm deep chamber, and the cell suspension naturally formed a very thin disk shape of 20 µm in thickness and 5 cm² in area between the sapphire cover ship and the flat holder bottom, as is illustrated in FIG. 12. The sapphire chip was used instead of a steel film to prevent cell mechanical damage resulting from the impact of liquid nitrogen flow, due to the fact that the isolated cells have no supporting structures as those in tissues. The samples were cooled by being placed directly under the liquid nitrogen blade jet array with the cover sheet surface vertically receiving all three liquid jets to cover the whole sapphire surface. The cooling rate for the cells is technically difficult to measure due to the small cell size, but it can be estimated to be higher than $10^5$ K/min, i.e., similar to what was achieved in FIG. 16, because of the thickness of the sapphire chip. Final temperature for the tissues was nominally −196 degrees C. After 10 sec exposure, the sample cavity was immediately thawed under a 37 degrees C. waterjet. The post-thaw viability was assessed based on standard Trypan blue exclusion assay and the use of an automatic cell counter. The post-thaw functionality was assessed by cell plating efficiency as adding each 10 µl thawed suspension sample to one well of a 96-well plate. The post-thaw viability was comparable to that of fresh samples (>90% viability): as two typical examples shown in FIG. 20A and FIG. 20B for one mMSC and one hMSC sample, respectively, with majority of the cells marked by light colored circle identified by the cell counter as alive cells vs. several marked by dark circle as dead cells. However, the cells did not plate in the wells of the culturing plates. The loss of cell functionality can result from the partial intracellular ice formation resulting from the relatively slow cooling rate, as the outcome of the use of relatively thick sapphire chip. Therefore, the example sufficiently demonstrates the efficiency of the using the method to successfully prevent cell membrane cryo-damage without any permeating cryoprotectant. Uniformity of cooling is demonstrated by the high survival rate of all stem cells (ca. >$10^5$ cells) in the sample-approaching 100% survival. The high survivability demonstrates a cooling rate of approaching, or exceeding, $10^6$ K/min.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations can be applied to the compositions and methods and in the steps or in the sequence of steps of the methods described herein without departing from the concept, spirit and scope of the disclosure. More specifically, it will be apparent that certain agents or objects which are related can be substituted for the objects and agents described herein while the same or similar results would be achieved. All such similar substitutes and modifications apparent to those skilled in the art are deemed to be within the spirit, scope and concept of the disclosure as defined by the appended claims.

REFERENCES

[1] Boutron P, Mehl P. 1990. Theoretical prediction of devitrification tendency: determination of critical warming rate without using finite expansions. Cryobiology. 27: 359-377. PMID: 2203605
[2] Ren H S, Wei Y, Hua T C and Zhang J. 1994. Theoretical prediction of vitrification and devitrification tendencies for cryoprotective solutions. Cryobiology. 31: 47-56.
[3] Jiao A, Han X, Critser J K, Ma H. 2006. Numerical investigations of transient heat transfer characteristics and vitrification tendencies in ultra-fast cell cooling processes. Cryobiology. 52:386-92.
[4] Han, X., & Critser, J. K. 2009. Measurement of the size of intracellular ice crystals in mouse oocytes using a melting point depression method and the influence of intracellular solute concentrations. Cryobiology, 59(3), 302-307.
[5] Howard R. HumeRonald R. WameckeGary L. Palmer-Leslie J. Fekete, System and method for delivering cryogenic fluid, U.S. Pat. No. 7,310,955B2.
[6] Damerval Frederique, Varet Thierry, Debionne Thierry, Richard Frederic, NITROJET: decontamination, cutting and concrete scabbling by nitrogen technology, Proceedings of the GLOBAL 2009 congress—The Nuclear Fuel Cycle: Sustainable Options and Industrial Perspectives.
[7] Ron Warnecke, Mark S. Denton, Innovative D&D Technology Utilizing High Pressure Liquid Nitrogen for Scabbling, Cutting & Decontamination, WM2009 Conference, Mar. 1-5, 2009, Phoenix, AZ.
[8] Zbigniew Zurecki, John Herbert Frey, Jean-Philippe Trembley, Apparatus and method for transferring a cryogenic fluid, U.S. Pat. No. 6,513,336B2.
[9] Ranajit Ghosh, Jeffrey A. Knopf, Daniel J. Gibson, Thomas Mebrahtu, Cryogenic Machining of Polymeric Biomaterials: An Intraocular Lens Case Study, ASM Materials & Processes for Medical Devices Conference, 2007, At Palm Desert, Ca.

What is claimed is:

1. A cooling apparatus comprising:
a manifold two-phase blade-jet assembly unit comprising:
    a manifold;
    a plurality of interior device blade units;
    a plurality of exterior device blade units; and
a sample holder system,
wherein the cooling apparatus is configured to form a plurality of liquid cryogen jets and a plurality of vapor cryogen jets.

2. The cooling apparatus of claim 1, further comprising a source of a liquid cryogen and a source of a vapor cryogen.

3. The cooling apparatus of claim 1, wherein the plurality of interior device blade units form a plurality of inlet ports.

4. The cooling apparatus of claim 1, wherein the plurality of interior device blade units form a plurality of exit ports.

5. The cooling apparatus of claim 1, wherein the liquid cryogen jets and the vapor cryogen jets are interlaced position-wise, such that each liquid cryogen jet is flanked on each side by a vapor cryogen jet.

6. The cooling apparatus of claim 1, wherein the interior device blade units and exterior device blade units are comprised of stainless steel, brass, copper, or aluminum.

7. The cooling apparatus of claim 1, wherein the sample holder system comprises a material to be subjected to cooling.

8. The cooling apparatus of claim 7, wherein the material is comprised of multiple masses and compositions.

9. The cooling apparatus of claim 1, wherein the apparatus comprises multiple sample holders within the sample holder system.

10. The cooling apparatus of claim 1, wherein the sample holder system comprises at least one of a sample straw unit, a sample button unit, a sample straw carriage unit, a sample button carriage unit, a combination of sample straw and button carriage unit, and a sample holder-carriage unit.

11. The cooling apparatus of claim 10, for the purpose of ultra-fast cooling of one or more thin biomaterial tissue samples and for maintaining sample purity, wherein the sample holder system includes a sample button unit that comprises a closed container that has a removable lid, and at least one thin window with high thermal conductivity over the temperature range of cooling, and wherein the said biomaterial tissue samples can be maintained in close thermal contact with the thin window.

12. The cooling apparatus of claim 10, for the purpose of ultra-fast cooling a one or more small units of biomaterial samples and for maintaining sample purity, wherein the sample holder system includes a sample straw unit that comprises a closed container that has removable end caps, and at least one thin window with high thermal conductivity over the temperature range of cooling, and wherein the said small units of biomaterial samples can be maintained in close thermal contact with said thin window.

13. The cooling apparatus of claim 1 wherein the apparatus comprises a plurality of manifold two-phase blade-jet assembly units.

14. A method of cooling a material, the method comprising the steps of:
providing the cooling apparatus of claim 1;
loading the material to be cooled into the sample holder system;
activating an exhaust system for a vapor cryogen;
inserting the sample holder system under a plurality of liquid cryogen jets and a plurality of vapor cryogen jets generated by the manifold two-phase blade-jet assembly unit; and
cooling the material.

15. The method of claim 14, further comprising removing the sample holder system that has been cooled from the cooling apparatus.

16. The method of claim 14, further comprising storing the sample holder system that has been cooled.

17. The method of claim 14, further comprising sealing each loaded individual sample holder.

18. The method of claim 14, wherein a rate of cooling is sufficient to vitrify the material.

19. The method of claim 14, wherein a rate of cooling is sufficient to partially vitrify the material.

20. The method of claim 14, wherein a rate of cooling is sufficient to cryopreserve the material.

21. The method of claim 14, wherein the material is cryopreserved in the absence of a cryoprotective agent.

22. The method of claim 14, where the material is a biomaterial.

23. The method of claim 22, wherein the biomaterial is selected from the group comprising human biomaterials, proteins, peptides, cells, stem cells, antibodies, neurons, human tissue, organs, cornea, skin, retina, eggs, sperm, embryos, body fluids, blood, serum, lymph fluid, animal tissue, plant biomaterials, plant tissue, germ plasma, pollen, plant sap, and bioengineered tissue.

24. The method of claim 22, wherein the biomaterial is selected from the group comprising human biomaterials, proteins, peptides, cells, stem cells, antibodies, neurons, human tissue, organs, cornea, skin, retina, eggs, sperm, embryos, body fluids, blood, serum, lymph fluid, animal tissue, plant biomaterials, plant tissue, germ plasma, pollen, plant sap, and bioengineered tissue in the presence of at least one cryoprotective agent (CPA).

25. The method of claim 22, wherein a cooling rate of the biomaterial is about $10^3$ K/min to about $10^6$ K/min.

26. The method of claim 22, wherein an area of the biomaterial is about 10 cm×10 cm.

27. The method of claim 22, wherein an area of the biomaterial about $10^{-4}$ cm$^2$ to about 1000 cm$^2$.

28. The method of claim 14, wherein the material has a mass between about 1 nanogram and about 10 grams.

29. The method of claim 14, where the material is an inorganic material.

30. The method of claim 14, wherein the method of cooling is for use in diagnostic cytology or tissue fixation.

31. The cooling apparatus of claim 4, wherein a first portion of the plurality of exit ports are configured to form the plurality of liquid cryogen jets, and a second portion of the plurality of exit ports are configured to form the plurality of vapor cryogen jets.

* * * * *